United States Patent
Urakawa et al.

(10) Patent No.: US 11,616,885 B2
(45) Date of Patent: Mar. 28, 2023

(54) IMAGE FORMING APPARATUS AND IMAGE FORMING SYSTEM FOR RESTRICTING DISPLAY INFORMATION FROM BEING DISPLAYED DURING REMOTE CONTROL

(71) Applicant: BROTHER KOGYO KABUSHIKI KAISHA, Nagoya (JP)

(72) Inventors: Yutaka Urakawa, Nagoya (JP); Tomoya Kaneko, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 23 days.

(21) Appl. No.: 17/193,574

(22) Filed: Mar. 5, 2021

(65) Prior Publication Data

US 2021/0306485 A1  Sep. 30, 2021

(30) Foreign Application Priority Data

Mar. 31, 2020 (JP) .............................. JP2020-062349

(51) Int. Cl.
*H04N 1/00* (2006.01)
*G06F 3/14* (2006.01)

(52) U.S. Cl.
CPC ....... *H04N 1/00411* (2013.01); *G06F 3/1454* (2013.01); *H04N 1/00241* (2013.01); *H04N 1/00493* (2013.01)

(58) Field of Classification Search
None
See application file for complete search history.

(56) References Cited

U.S. PATENT DOCUMENTS

| | | | |
|---|---|---|---|
| 2011/0142519 A1* | 6/2011 | Tsukuda | B41J 3/4075 400/76 |
| 2017/0063875 A1* | 3/2017 | Yanase | H04L 63/0876 |
| 2017/0264760 A1* | 9/2017 | Sato | G06F 3/1285 |
| 2017/0300893 A1* | 10/2017 | Sasaki | G06Q 20/209 |
| 2018/0246687 A1* | 8/2018 | Nishio | G06F 3/1221 |
| 2021/0042082 A1* | 2/2021 | Yamaguchi | H04N 1/00477 |

FOREIGN PATENT DOCUMENTS

JP  2017-049851 A  3/2017

\* cited by examiner

*Primary Examiner* — Miya J Williams
*Assistant Examiner* — Pawan Dhingra
(74) *Attorney, Agent, or Firm* — Scully Scott Murphy and Presser

(57) ABSTRACT

An image forming apparatus includes a communication interface, a display, and a controller configured to, when the image forming apparatus is remotely connected with an information processing device via the communication interface, transmit, to the information processing device, screen data for causing the information processing device to display a same screen as a display screen being displayed on the display, when receiving remote access from the information processing device, perform display processing for the display screen in accordance with the remote access, and when the remote access is received while a particular screen is being displayed as the display screen on the display, impose a display restriction on the display screen.

17 Claims, 25 Drawing Sheets

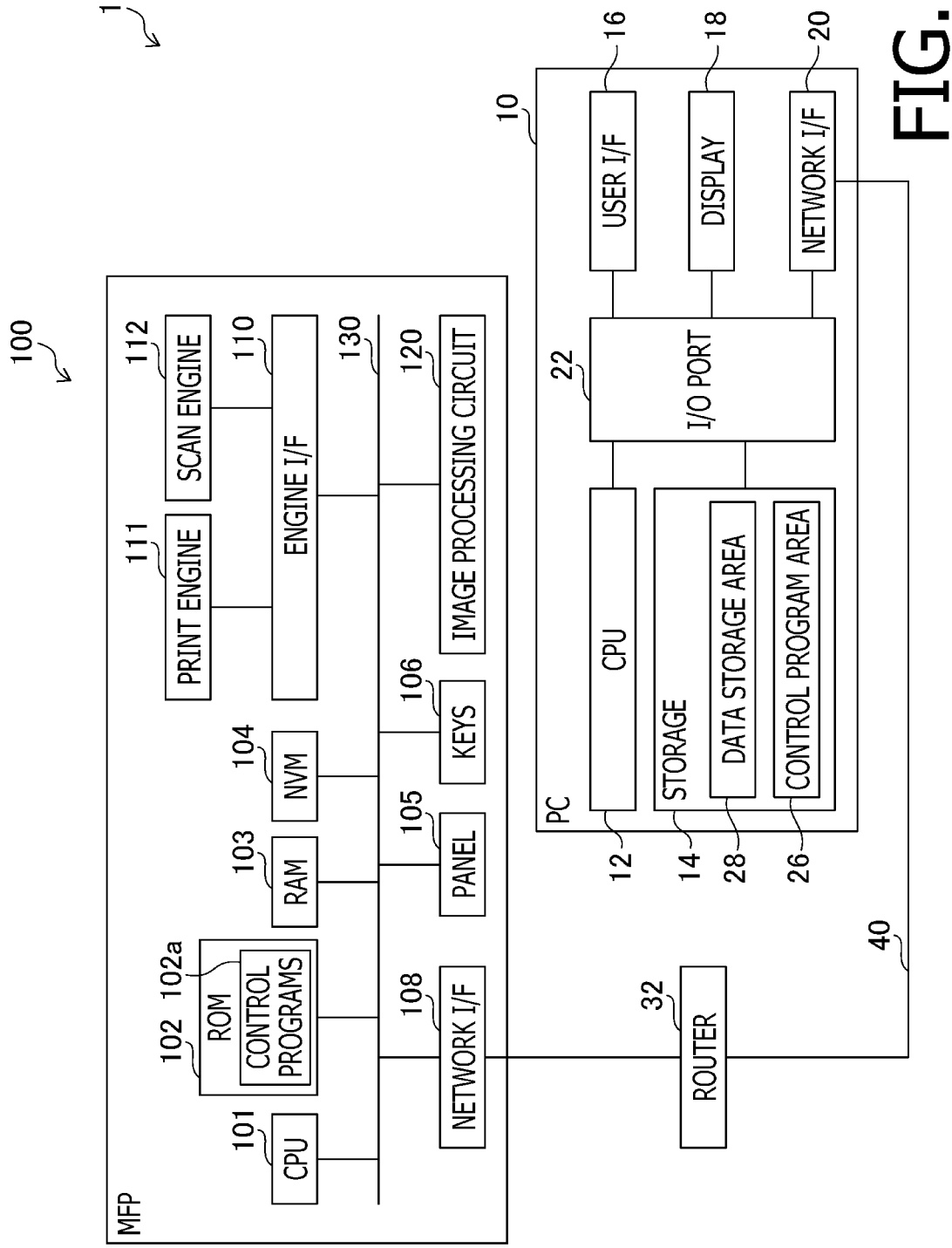

IMAGE FORMING APPARATUS AND IMAGE FORMING SYSTEM FOR RESTRICTING DISPLAY INFORMATION FROM BEING DISPLAYED DURING REMOTE CONTROL

CROSS-REFERENCE TO RELATED APPLICATION

This application claims priority under 35 U.S.C. § 119 from Japanese Patent Application No. 2020-062349 filed on Mar. 31, 2020. The entire subject matter of the application is incorporated herein by reference.

BACKGROUND

Technical Field

Aspects of the present disclosure are related to an image forming apparatus and an image forming system for restricting display information from being displayed during remote control of the image forming apparatus.

Related Art

An information processing system has been known that is configured to prevent a user of an image processing apparatus from viewing information that the user is not authorized to access, when the authority of the image processing apparatus has been changed during remote control of the image processing apparatus. Further, as a specific method for preventing the user from viewing such information that the user is not authorized to view, a technology has been known in which a UI display of the image processing apparatus is blacked out, or display information of an item that is not allowed to be displayed is put in a non-display state or equivalent.

SUMMARY

However, the known information processing system does not meet a request for restricting display information from being displayed when a particular screen is being displayed.

Aspects of the present disclosure are advantageous to provide one or more improved techniques that make it possible to restrict display information from being displayed when a particular screen is being displayed.

According to aspects of the present disclosure, an image forming apparatus is provided, which includes a communication interface, a display, and a controller. The controller is configured to, when the image forming apparatus is remotely connected with an information processing device via the communication interface, transmit, to the information processing device, screen data for causing the information processing device to display a same screen as a display screen being displayed on the display, when receiving remote access from the information processing device, perform display processing for the display screen in accordance with the remote access, and when the remote access is received while a particular screen is being displayed as the display screen on the display, impose a display restriction on the display screen.

According to aspects of the present disclosure, further provided is an image forming apparatus that includes a communication interface, a display, and a controller. The controller is configured to, when the image forming apparatus is remotely connected with an information processing device via the communication interface, transmit, to the information processing device, screen data for causing the information processing device to display a same screen as a display screen being displayed on the display, when receiving remote access from the information processing device, perform display processing for the display screen in accordance with the remote access, when the image forming apparatus is not remotely connected with the information processing device via the communication interface, control the display to display a first screen that is a particular screen, and when the image forming apparatus is remotely connected with the information processing device via the communication interface, control the display to display a second screen instead of the first screen, the second screen being displayed in a display mode different from a display mode for the first screen.

According to aspects of the present disclosure, further provided is an image forming system that includes an image forming apparatus, and an information processing device configured to remotely access the image forming apparatus. The information processing device includes a first communication interface, a first display, and a first controller. The first controller is configured to, when the information processing device is remotely connected with the image forming apparatus via the first communication interface, transmit, to the image forming apparatus, a request for screen data for causing the first display to display a same screen as a display screen being displayed on the image forming apparatus, receive the screen data transmitted by the image forming apparatus in response to the request, control the first display to display the same screen as the display screen being displayed on the image forming apparatus, and transmit, to the image forming apparatus, remote access according to an input operation performed to the same screen on the first display as the display screen. The image forming apparatus includes a second communication interface, a second display, and a second controller. The second controller is configured to, when the image forming apparatus is remotely connected with the information processing device via the second communication interface, receive the request from the information processing device, transmit, to the information processing device, the screen data for causing the first display of the information processing device to display the same screen as the display screen being displayed on the second display, receive the remote access from the information processing device, perform display processing for the display screen in accordance with the remote access, and when the remote access is received while a particular screen is being displayed as the display screen on the second display, impose a display restriction on the display screen.

According to aspects of the present disclosure, further provided is an image forming system that includes an image forming apparatus, and an information processing device configured to remotely access the image forming apparatus. The information processing device includes a first communication interface, a first display, and a first controller. The first controller is configured to, when the information processing device is remotely connected with the image forming apparatus via the first communication interface, transmit, to the image forming apparatus, a request for screen data for causing the first display to display a same screen as a display screen being displayed on the image forming apparatus, receive the screen data transmitted by the image forming apparatus in response to the request, control the first display to display the same screen as the display screen being displayed on the image forming apparatus, and transmit, to the image forming apparatus, remote access according to an input operation performed to the same screen on the first display as the display screen. The image forming apparatus includes a second communication interface, a second display, and a second controller. The second controller is configured to, when the image forming apparatus is remotely connected with the information processing device via the second communication interface, receive the request from the information processing device, and transmit, to the information processing device, screen data for causing the first display of the information processing device to display the same screen as the display screen being displayed on the second display, when receiving the remote access from the information processing device, perform display processing for the display screen in accordance with the remote access, when the image forming apparatus is not remotely connected with the information processing device via the second communication interface, control the second display to display a first screen that is a particular screen, and when the image forming apparatus is remotely connected with the information processing device via the second communication interface, control the second display to display a second screen instead of the first screen, the second screen being displayed in a display mode different from a display mode for the first screen.

BRIEF DESCRIPTION OF THE ACCOMPANYING DRAWINGS

FIG. 1 is a block diagram showing a control configuration of an image forming system including a PC and an MFP, in a first illustrative embodiment according to one or more aspects of the present disclosure.

DETAILED DESCRIPTION

Figure 2A:
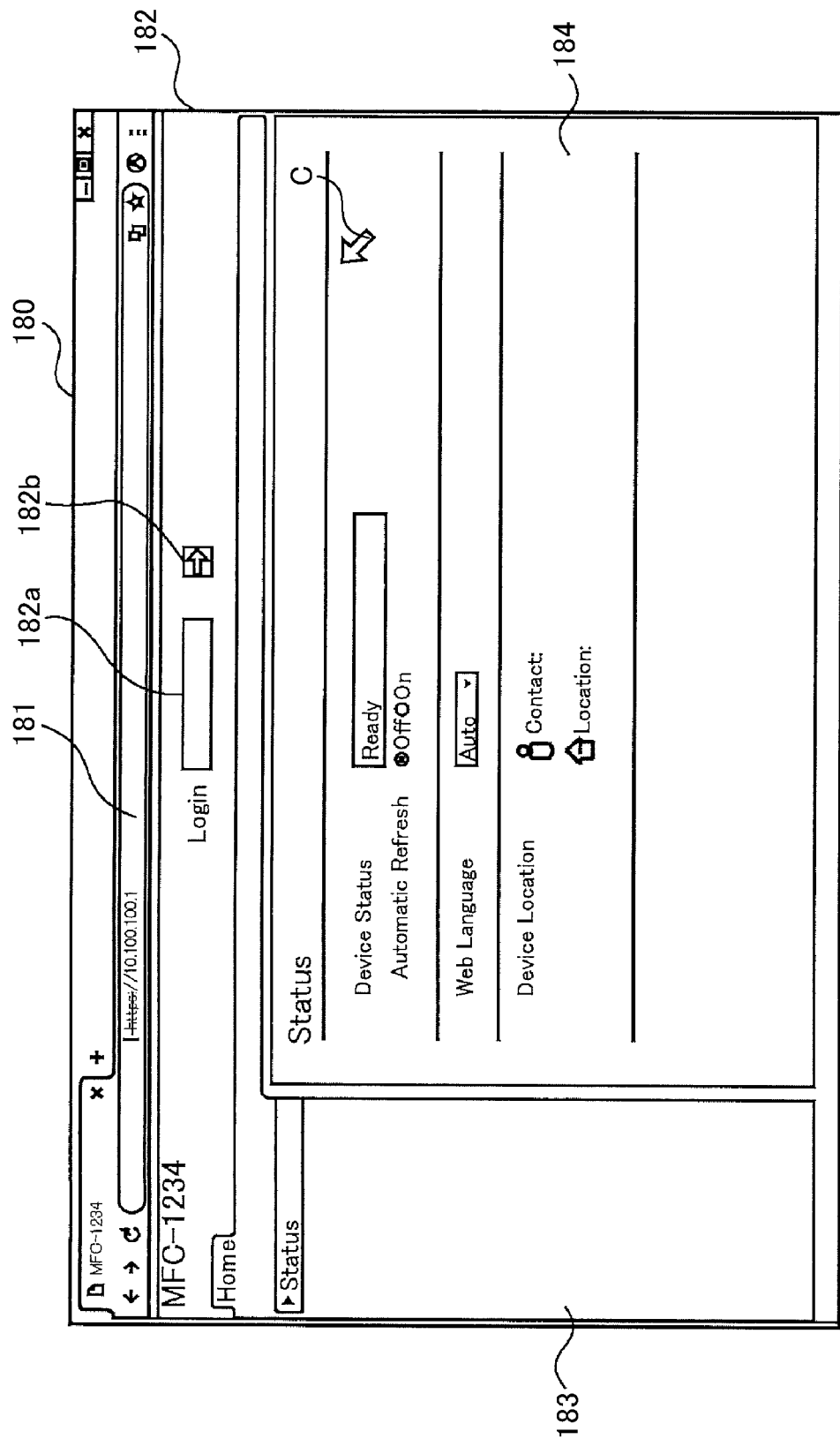
FIGS. 2A and 2B show examples of a display screen on a browser executed on the PC, in the first illustrative embodiment according to one or more aspects of the present disclosure.

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, illustrative embodiments according to aspects of the present disclosure will be described with reference to the accompanying drawings.

First Illustrative Embodiment

FIG. 1 is a block diagram showing a control configuration of an image forming system 1 in a first illustrative embodiment. As shown in FIG. 1, the image forming system 1 includes a PC 10, an MFP ("MFP" is an abbreviation for "Multi-Function Peripheral") 100 and a router 32.

The PC 10 includes a CPU 12, a storage 14, a user I/F ("I/F" is an abbreviation for "interface") 16, a display 18, and a network I/F 20. The CPU 12, the storage 14, the user I/F 16, the display 18, and the network I/F 20 are communicably interconnected via an I/O ("I/O" is an abbreviation for "input-output") port 22.

Typically, the user I/F 16 may include a keyboard and a mouse.

The display 18 includes a display device such as a liquid crystal display or an organic electroluminescence display, and a drive circuit for driving the display device. When a touch panel type display is used as the display 18, a user is allowed to perform input operations by touching input buttons on a screen of the display 18. Therefore, in this case, the display 18 also serves as the user IF 16.

The CPU 12 is configured to execute various application programs (hereinafter, which may be simply referred to as "applications") including a program for a main process that will be described below with reference to FIG. 4, and execute firmware.

The storage 14 includes a ROM, a RAM, an HDD, an SSD and an optical disk drive. The storage 14 has a data storage area 28 and a control program area 26. The data storage area 28 is an area for storing data necessary for the CPU 12 to execute applications such as the program for the main process. The control program area 26 is an area for storing an OS, the program for the main process, various other applications, and the firmware.

The network I/F 20 is configured to connect the PC 10 with a communication network 40. The communication network 40 may be a wired LAN or a wireless LAN. The network I/F 20 may include one or both of a LAN I/F and a WLAN I/F. In the first illustrative embodiment, the communication network 40 is connected with the router 32 and the MFP 100. Therefore, the PC 10 is enabled to communicate various types of data with the MFP 100 via the router 32.

The MFP 100 includes a CPU 101, a ROM 102, a RAM 103, and an NVM ("NVM" is an abbreviation for "Non-Volatile Memory") 104.

The CPU 101 is configured to control the entire MFP 100. Specifically, for instance, the CPU 101 controls a print engine 111 and a scan engine 112 via an engine I/F 110.

The ROM 102 is configured to store control programs 102a (including a program for a main process that will be described below with reference to FIGS. 8A and 8B) to be executed by the CPU 101. The CPU 101 reads out the control programs 102a stored in the ROM 102 and executes various processes. The RAM 103 is configured to temporarily store various types of data such as image data. The RAM 103 is also used as a storage area to temporarily store data and signals used when the CPU 101 executes the control programs 102a, or as a work area for data processing. The NVM 104 is a non-volatile memory configured to store various types of information such as setting information.

The MFP 100 further includes a panel 105 and keys 106. In the first illustrative embodiment, the panel 105 is a touch panel. The panel 105 is configured to display thereon various screens depending on states of the MFP 100. The user may perform input operations by touching input buttons on a screen. In the present disclosure, "touching input buttons on a screen" may also be expressed as "pressing input buttons on a screen." The keys 106 are hard keys, i.e., keys formed by hardware. The keys 106 may include, but are not limited to, a power switch, a reset switch, and a numeric.

The MFP 100 further includes a network I/F 108. The network I/F 108 is configured in substantially the same manner as the network I/F 20 of the PC 10. Thus, as described above, the MFP 100 is enabled to communicate various types of data with the PC 10.

The MFP 100 further includes the engine I/F 110. The engine I/F 110 is connected with the print engine 111 and the scan engine 112. The print engine 111 is configured to print an image on a sheet. The print engine 111 includes a printing device such as an electrophotographic printing device, an inkjet printing device or a thermal printing device. The scan engine 112 is configured to scan an image from a document. The scan engine 112 includes an image sensor such as a CCD or a CIS. The engine I/F 110 is an interface configured to control the print engine 111 and the scan engine 112.

The MFP 100 further includes an image processing circuit 120. The image processing circuit 120 is configured to rasterize image data concerning the print job and output the rasterized image data to the print engine 111. The image processing circuit 120 is further configured to process and convert image data scanned from a document by the scan engine 112 into digital data. The digital data obtained by processing the scanned image data may be transmitted externally via the network I/F 307 or may be supplied to the print engine 111 and then output as an image printed on a sheet.

The CPU 101, the ROM 102, the RAM 103, the NVM 104, the panel 105, the keys 106, the USB I/F 107, the network I/F 108, the engine I/F 110 and the image processing circuit 120 are interconnected via a bus 130.

FIG. 2A shows an example of a browser screen 180 that is displayed on the display 18 when the user launches a browser on the PC 10 and inputs a URL "10.100.100.1" in a URL entry field 181. The input URL "10.100.100.1" indicates a storage location of an EWS ("EWS" is an abbreviation for "Embedded Web Server") that is one of the control programs 102a of the MFP 100.

In a page display area 182 of the browser screen 180, pages provided by the EWS are displayed. Each page provided by the EWS includes an item pane 183 and a detail pane 184. The page shown in FIG. 2A is an initial page provided by the EWS. When the user enters a password in a login password entry field 182a on the initial page and clicks a login button 182b with a cursor C, the user is allowed to log in to a function setting page provided by the EWS that is for setting various functions of the MFP 100.

Figure 2B:
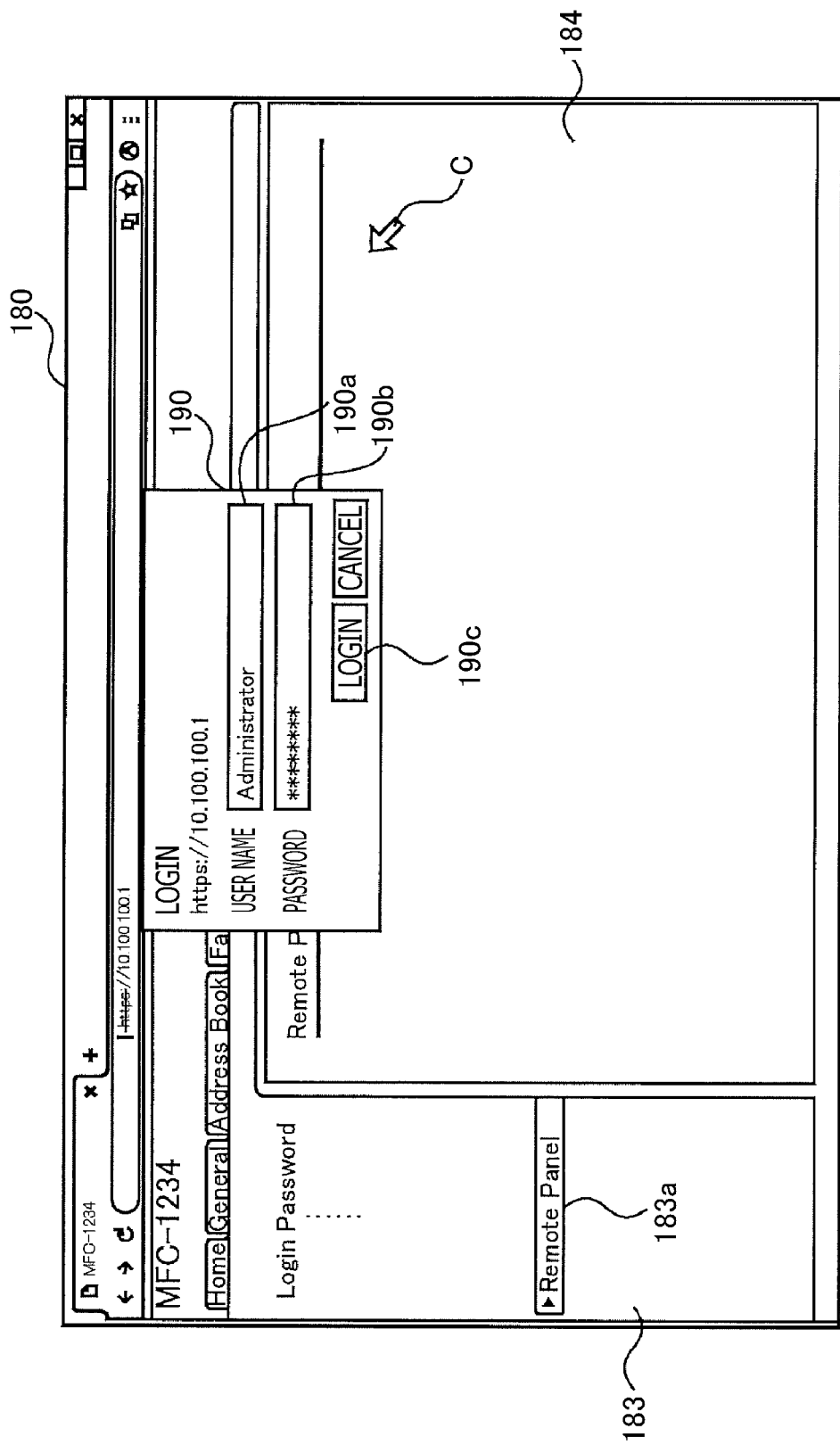

FIG. 2B shows an example of the browser screen 180 that is displayed when a "Remote Panel" item 183a, among a plurality of items listed in the item pane 183 on the function setting page, is clicked. "Remote Panel" item 183a is an item for displaying "Remote Panel" in the detail pane 184. In the example of the browser screen 180 shown in FIG. 2B, a login authentication screen 190 for login authentication to log in to the "Remote Panel" is displayed in a pop-up manner. The following provides a reason why the login authentication is performed before displaying the "Remote Panel."

The "Remote Panel" is a virtual screen that is virtually generated as a screen on a panel of a remotely-connected device in order to remotely access the device. Therefore, when an input operation is performed on the "Remote Panel" displayed in the detail pane 184, substantially the same input operation is performed on the panel of the remotely accessed device. Specifically, in the first illustrative embodiment, substantially the same input operation may be performed on the panel 105 of the MFP 100. Thus, by displaying the "Remote Panel" on the PC 10, a third party is allowed to freely and remotely access the MFP 100 from the outside via the PC 10. Therefore, it is necessary to restrict users authorized to display the "Remote Panel." For this reason, even after logging in to the function setting page, further login authentication is required to display the "Remote Panel."

Figure 2C:
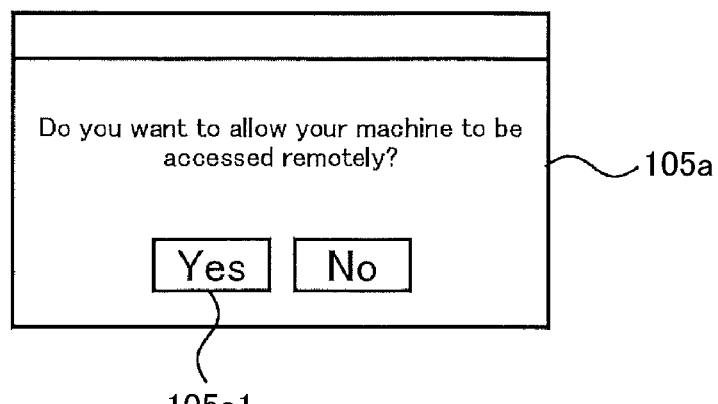
FIG. 2C shows an example of a display screen on a panel of the MFP, in the first illustrative embodiment according to one or more aspects of the present disclosure.

The users authorized to log in to the "Remote Panel" are limited to administrators having administrative privileges. Therefore, a user (e.g., an administrator) who attempts to log in to the "Remote Panel" is required to input an administrator name (e.g., "Administrator") in a user name entry field 190a on the login authentication screen 190 and input an administrator password in a password entry field 190b. Then, when the said user clicks a login button 190c with the cursor C, a checking screen 105a for checking whether the MFP 100 is allowed to be remotely controlled is displayed on the panel 105 of the MFP 100, as shown in FIG. 2C. When a user of the MFP 100 presses a "Yes" button 105a1 on the checking screen 105a, the "Remote Panel" is displayed in the detail pane 184.

Figure 3A:
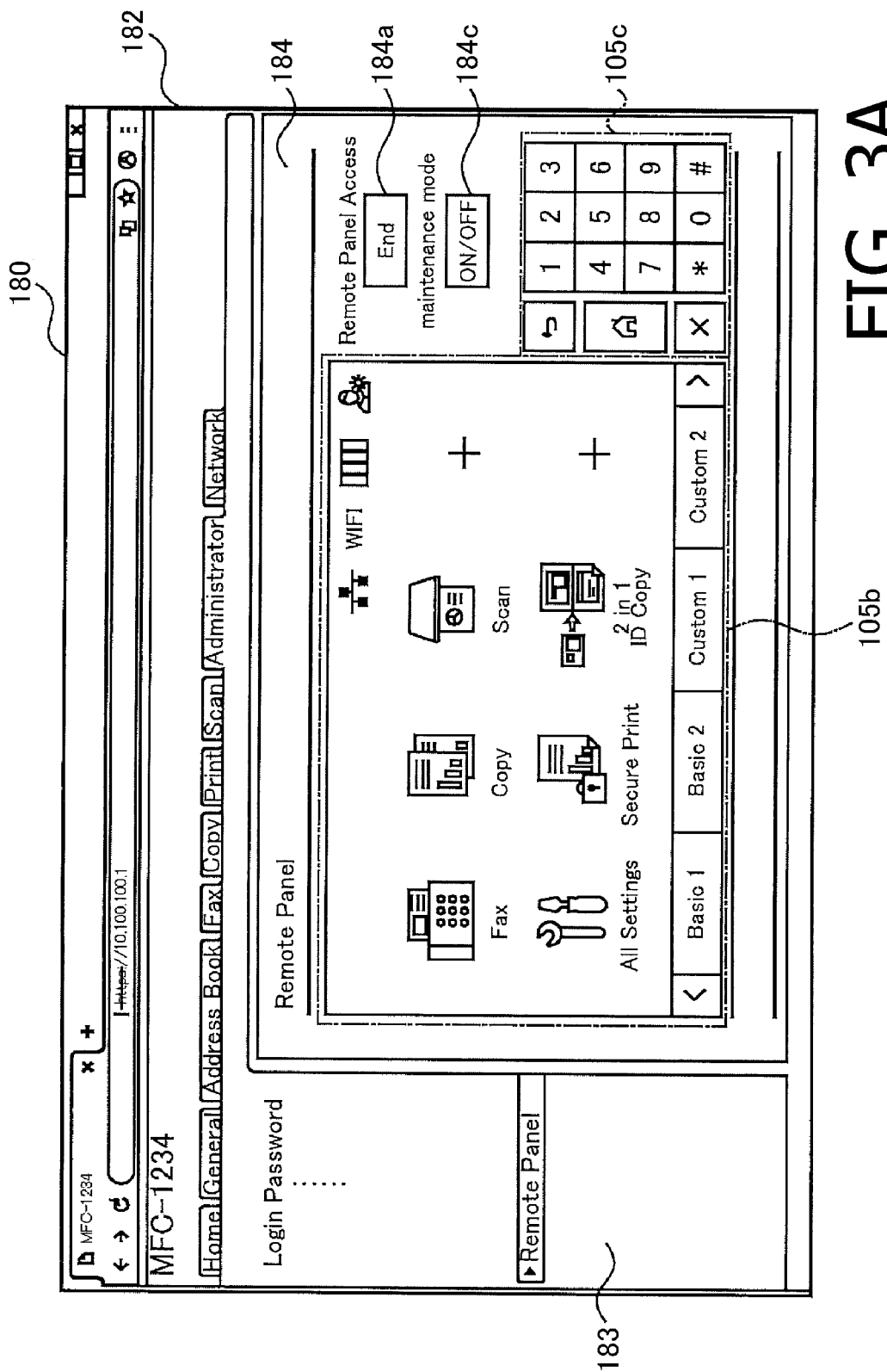
FIG. 3A shows an example of a "Remote Panel" after a transition from the display screen on the browser as shown in FIG. 2B, in the first illustrative embodiment according to one or more aspects of the present disclosure.

FIG. 3A shows an example of the "Remote Panel" displayed in the detail pane 184. The "Remote Panel" in the illustrated example includes a panel display 105b that is the same as displayed on the panel 105 of the MFP 100 and a key display 105c that virtually shows the keys 106 of the MFP 100. Display data for displaying the "Remote Panel" is obtained from the EWS. As described above, the EWS is software. Therefore, "obtained from the EWS" strictly denotes "obtained from the MFP 100 when the CPU 101 of the MFP 100 is executing the EWS." Nonetheless, in the following description as well, "obtained from the MFP 100 when the CPU 101 of the MFP 100 is executing the EWS" may be simply expressed as "obtained from the EWS" in an abbreviated manner.

The "Remote Panel" further includes an End button 184a displayed thereon, which is a button for closing the "Remote Panel." The administrator may terminate the "Remote Panel" by clicking the End button 184a.

The "Remote Panel" further includes an ON/OFF button 184c displayed thereon, which is a button for shifting the MFP 100 to a maintenance mode and also for terminating the maintenance mode after the mode shift. The administrator may shift the MFP 100 to the maintenance mode by clicking the ON/OFF button 184c. However, an authentication is required for shifting the MFP 100 to the maintenance mode, before the MFP 100 shifts to the maintenance mode. Therefore, when the ON/OFF button 184c is clicked on the "Remote Panel" (see FIG. 3A) for a device mode, another "Remote Panel" (see FIG. 3B) for authentication is displayed to perform the authentication to shift the MFP 100 to the maintenance mode. When the authentication is successfully completed on the "Remote Panel" for authentication, the MFP 100 shifts to the maintenance mode.

Figure 3B:
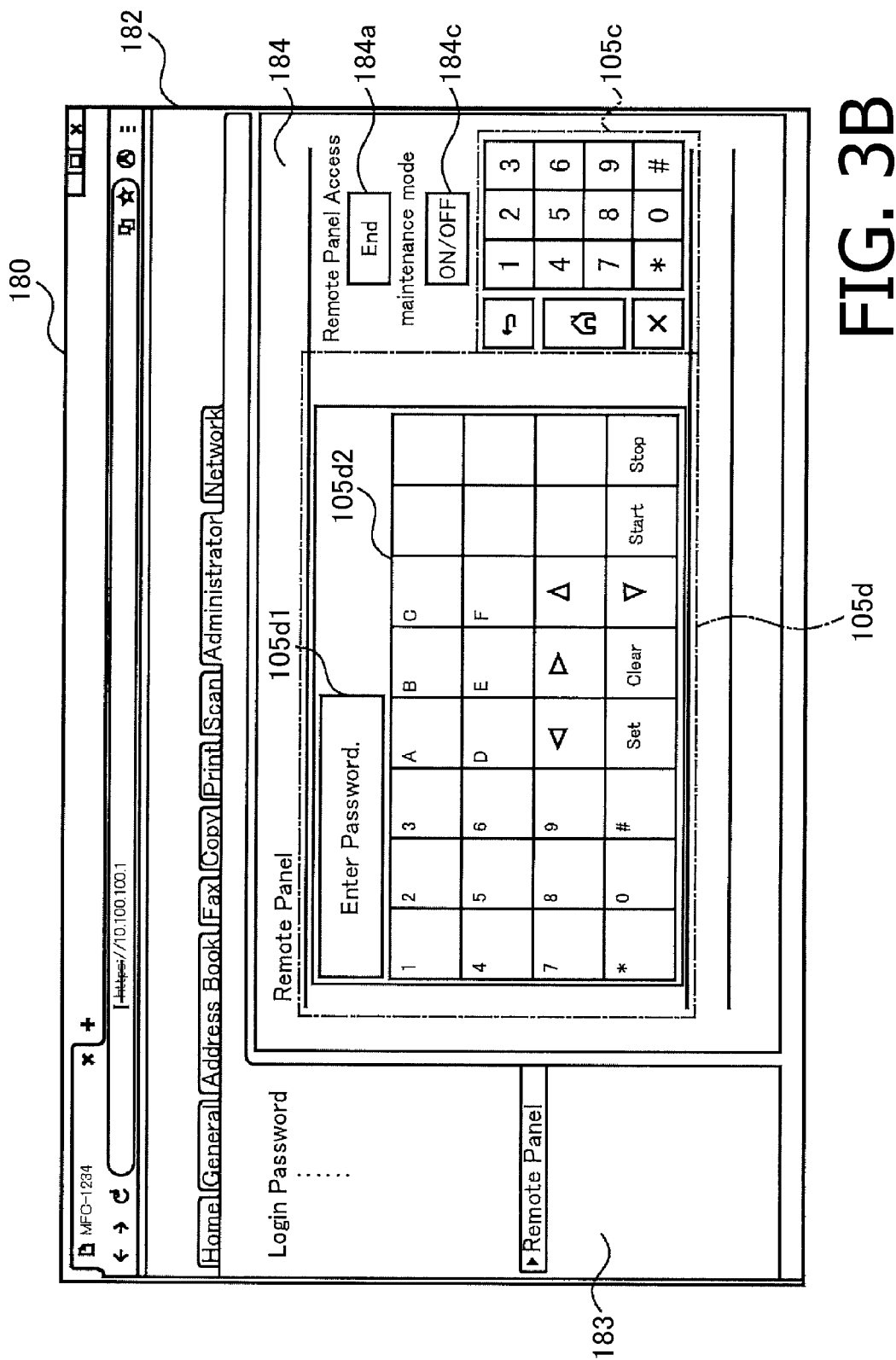
FIG. 3B shows an example of the "Remote Panel" for authentication to shift the MFP to a maintenance mode, in the first illustrative embodiment according to one or more aspects of the present disclosure.

FIG. 3B shows an example of the "Remote Panel" for authentication to shift the MFP 100 to the maintenance mode. The administrator may enter a password in a password entry field 105d1 in a panel display 105d, for instance, using a software keyboard 105d2. When the authentication is successful, the MFP 100 makes a transition to the maintenance mode, and a "Remote Panel" for the maintenance mode is displayed. The "Remote Panel" for the maintenance mode is almost the same as the "Remote Panel" (see FIG. 3B) for authentication, but is different from the "Remote Panel" for authentication in only that the administrator is allowed to perform operations for maintenance on the "Remote Panel" for the maintenance mode. The password may be entered into the password entry field 105d1 using keys in the key display 105c.

The maintenance mode is a mode for performing maintenance of the MFP 100. Examples of the "maintenance" may include, but are not limited to, investigating causes of failure of the MFP 100, and changing setting values for setting items that general users are not allowed to change. The maintenance mode is such a special mode. Hence, further authentication is required before the MFP 100 shifts to the maintenance mode.

When the administrator clicks an indicated object such as an icon (e.g., a "Fax" icon, a "Copy" icon, etc.) or a button (e.g., a "Basic 1" button, a "Custom 1" button, etc.), in the panel display 105b on the "Remote Panel" for the device mode, the indicated object is displayed in a display mode (e.g., a display color) changed so as to make it recognizable that the indicated object has been operated. Likewise, the same indicated object on the panel 105 of the MFP 100 is also displayed in a changed display mode.

However, when a key of the software keyboard 105d2 is clicked on the "Remote Panel" (see FIG. 3B) for authentication, if the clicked key is displayed in a changed display mode, the password might be known by a third party, other than the administrator, who is looking at the panel 105 of the MFP 100. This is because even if the password being entered in the password entry field 105d1 is hidden by, for instance, "*," the third party may know the password by following the change in the display mode for each of the operated keys.

Therefore, on the "Remote Panel" for authentication, even if the software keyboard 105d2 is used, the display mode for each operated key is left unchanged. Similarly, on the "Remote Panel" for the maintenance mode as well, when the software keyboard 105d2 is used, the display mode for each operated key is left unchanged. The key display 105c is a virtual display of the keys 106 (i.e., hard keys) of the MFP 100. Hence, the display mode for each operated key of the key display 105c is left unchanged on the "Remote Panel" for the device mode as well.

Figure 4:
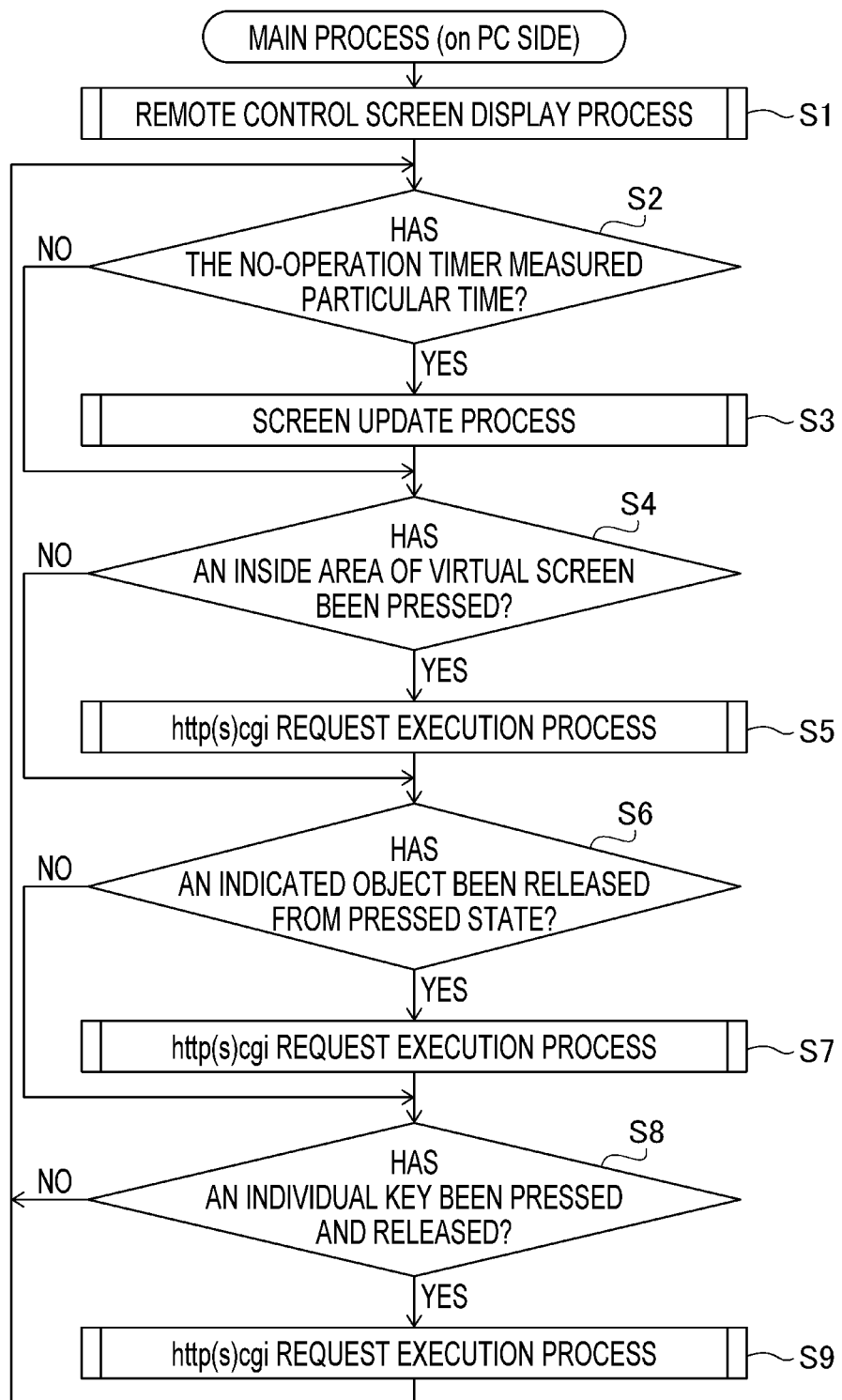
FIG. 4 is a flowchart showing a procedure of a main process to be performed by a CPU of the PC, in the first illustrative embodiment according to one or more aspects of the present disclosure.

FIG. 4 is a flowchart showing a procedure of a main process to be performed by the CPU 12 of the PC 10. The main process is performed by the CPU 12 after the login authentication is performed on the login authentication screen 190 shown in FIG. 2B. In the following description of each process, each of steps included in each process will be represented with "S."

In the main process shown in FIG. 4, the CPU 12 first performs a remote control screen display process (S1). The remote control screen is the "Remote Panel" displayed in the detail pane 184. Therefore, the remote control screen display process indicates a process of displaying the "Remote Panel" in the detail pane 184.

Figure 5:
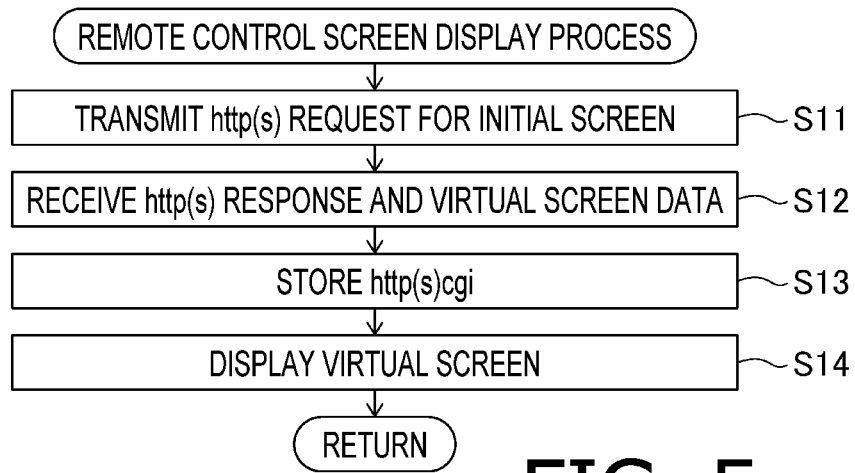
FIG. 5 is a flowchart showing a procedure of a remote control screen display process included in the main process shown in FIG. 4, in the first illustrative embodiment according to one or more aspects of the present disclosure.

FIG. 5 shows a detailed procedure of the remote control screen display process. In the remote control screen display process shown in FIG. 5, the CPU 12 first transmits an http(s) request for an initial screen (S11). Here, the http(s) request is a request according to an http(s) protocol. The reason why the request according to the http(s) protocol is transmitted as above is that a transmission destination of the request is the EWS, and therefore it is required to transmit the request according to a protocol interpretable by the EWS. The http(s) request for the initial screen is input from the network I/F 20 to the network I/F 108 via the communication network 40 and the router 32. Not only transmission of the http(s) request for the initial screen, but also data transmission from the PC 10 to the MFP 100 is performed through the same route. Conversely, data transmission from the MFP 100 to the PC 10 is performed through the reverse route.

Next, CPU 12 receives an http(s) response and virtual screen data sent by the EWS in response to receiving the http(s) request for the initial screen (S12). The http(s) response and the virtual screen data are generated and transmitted in a below-mentioned initial screen transmission process in S46 (see FIG. 8A).

Next, the CPU 12 stores an http(s)cgi in the data storage area 28 (S13). The http(s)cgi contains various scripts included in the http(s) response. It is noted that "cgi" is an abbreviation for "common gateway interface." In the first illustrative embodiment, as the various scripts, a no-operation timer script, a screen data request script, a screen pressing process script, and a release process script are generated (see S71 to S73 in FIG. 10). The CPU 12 is enabled to perform various processes such as a no-operation timer process and an http(s)cgi request transmission process by executing the various scripts.

Further, the CPU 12 displays a virtual screen based on the received virtual screen data, in the detail pane 184 (S14). Thereafter, the CPU 12 terminates the remote control screen display process. Thereby, the "Remote Panel" as shown in FIG. 3A is displayed in the detail pane 184.

Referring back to FIG. 4, the CPU 12 determines whether a no-operation timer has measured a particular time (S2). Here, the "particular time" is, for example, 0.5 seconds. The no-operation timer is a timer that is instructed to start in a below-mentioned step S35 (see FIG. 7).

When determining in S2 that the no-operation timer has measured the particular time (S2: Yes), the CPU 12 performs a screen update process (S3) and then proceeds to S4. Meanwhile, when determining that the no-operation timer has not measured the particular time (S2: No), the CPU 12 goes to S4 without executing S3.

Figure 6:
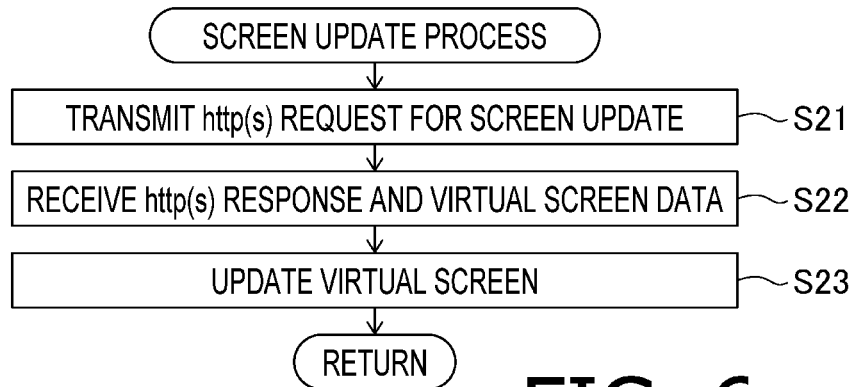
FIG. 6 is a flowchart showing a procedure of a screen update process included in the main process shown in FIG. 4, in the first illustrative embodiment according to one or more aspects of the present disclosure.

FIG. 6 shows a detailed procedure of the screen update process. In the screen update process shown in FIG. 6, first, the CPU 12 transmits an http(s) request for screen update (S21). Subsequently, the CPU 12 receives an http(s) response and virtual screen data sent by the EWS in response to receiving the http(s) request for screen update (S22). The http(s) response and the virtual screen data are generated and transmitted in a below-mentioned screen data transmission process in S48 (see FIG. 8A).

Then, the CPU 12 updates the virtual screen (i.e., the "Remote Panel") based on received HTML data (S23). Afterward, the CPU 12 terminates the screen update process. Thereby, the "Remote Panel" displayed in the detail pane 184 matches the current display screen on the panel 105 of the MFP 100.

Referring back to FIG. 4, the CPU 12 determines whether an inside area of the virtual screen has been pressed (S4). When determining that an inside area of the virtual screen has been pressed (S4: Yes), the CPU 12 performs an http(s)cgi request execution process (S5), and then proceeds to S6. Meanwhile, when determining that an inside area of the virtual screen has not been pressed (S4: No), the CPU 12 goes to S6 without executing S5.

Figure 7:
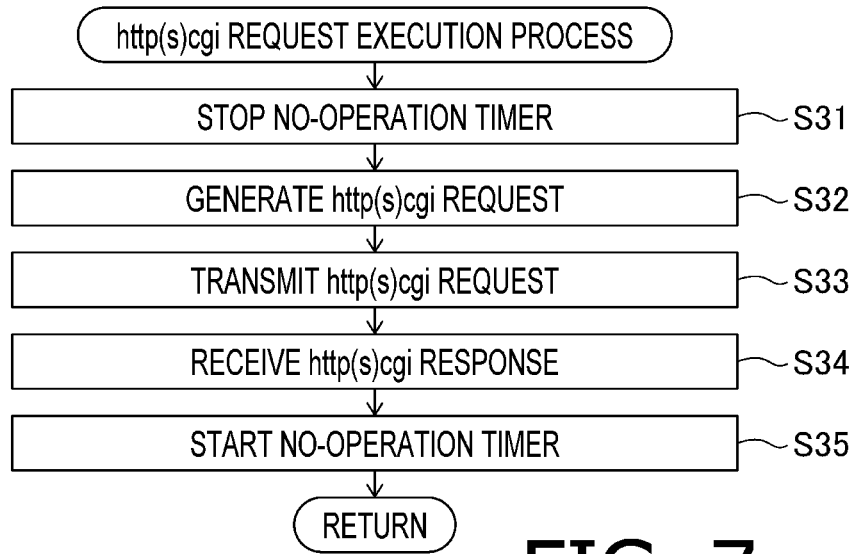
FIG. 7 is a flowchart showing a procedure of an http(s)cgi request execution process included in the main process shown in FIG. 4, in the first illustrative embodiment according to one or more aspects of the present disclosure.

FIG. 7 shows a detailed procedure of the http(s)cgi request execution process. In the http(s)cgi request execution process shown in FIG. 7, first, the CPU 12 stops the no-operation timer (S31). The reason why the no-operation timer is stopped is to postpone execution of the screen update process in S3 such that the screen of the "Remote Panel" is not updated until the http(s)cgi request execution process is completed. If there is an icon or a button in the pressed position on the virtual screen, the screen may transition into another one, or the color of the pressed button may change. The http(s)cgi request execution process is a process that makes such a change in the display mode of the display screen appear on the virtual screen. Therefore, if the screen update process is performed during the execution of the http(s)cgi request execution process, there may be a discrepancy between the virtual screen on the display 18 and the real screen on the panel 105. The process of S31 is for preventing the above problem.

Next, the CPU 12 generates an http(s)cgi request (S32) and transmits the generated http(s)cgi request (S33). The generated http(s)cgi request includes screen pressing information representing that the screen has been pressed, and coordinates (hereinafter referred to as "press coordinates") of the pressed position.

Subsequently, the CPU 12 receives an http(s)cgi response sent by the EWS in response to receipt of the http(s)cgi request and performs a process according to the received http(s)cgi response (S34). The http(s)cgi response is generated and transmitted in a below-mentioned screen pressing process in S50 (see FIG. 8B).

Further, the CPU 12 starts the no-operation timer (S35). Thereafter, the CPU 12 terminates the http(s)cgi request execution process. Afterward, when the no-operation timer measures the aforementioned particular time (e.g., 0.5 seconds), the CPU 12 performs the screen update process in S3 once.

Referring back to FIG. 4, the CPU 12 determines whether an indicated object has been released from a pressed state (S6). The indicated object is an object pressed and indicated when an inside area of the virtual screen is pressed. In other words, examples of the indicated body include both objects (e.g., icons and buttons) that fulfill meaningful functions when pressed and objects (e.g., part of a background image) that fulfill no meaningful functions even when pressed. Further, it is noted that, hereinafter, "released from the pressed state" may be simply expressed as "released."

When determining that the indicated object has been released from the pressed state (S6: Yes), the CPU 12 performs the http(s)cgi request execution process (S7), and thereafter proceeds to S8. Meanwhile, when determining that the indicated object has not been released from the pressed state (S6: No), the CPU 12 goes to S8 without executing S7. The http(s)cgi request execution process in S7 is the http(s)cgi request execution process shown in FIG. 7. However, contents of the http(s)cgi request generated when the http(s)cgi request execution process is performed in S7 is different from contents of the http(s)cgi request generated when the http(s)cgi request execution process is performed in S5. Specifically, the http(s)cgi request generated in S5 includes the screen pressing information, as described above. On the other hand, the http(s)cgi request generated in S7 includes release information representing that the indicated object has been released from the pressed state, and coordinates (hereinafter referred to as "release coordinates") of a position where the indicated object has been released from the pressed state.

In S8, the CPU 12 determines whether one of individual keys has been pressed and released. The individual keys are keys included in the key display 105c (see FIG. 3), and namely, correspond to the keys 106 of the MFP 100. When determining that one of the individual keys has been pressed and released (S8: Yes), the CPU 12 performs the http(s)cgi request execution process (S9), and thereafter goes back to S2. Meanwhile, the CPU 12 goes back to S2 without executing S9, when determining that one of the individual keys has not been pressed and/or not released (S8: No) (i.e., when at least one of two conditions is satisfied that include a condition that one of the individual keys has not been pressed, and another condition that one of the individual keys has not been released). However, contents of the http(s)cgi request generated when the http(s)cgi request execution process is performed in S9 is different from the contents of the http(s)cgi request generated when the http(s)cgi request execution process is performed in each of the steps S5 and S7. Specifically, the http(s)cgi request generated in S9 includes individual key information identifying the key that has been pressed and released from among the individual keys, and a release notification representing that the key has been released.

Figure 8A:
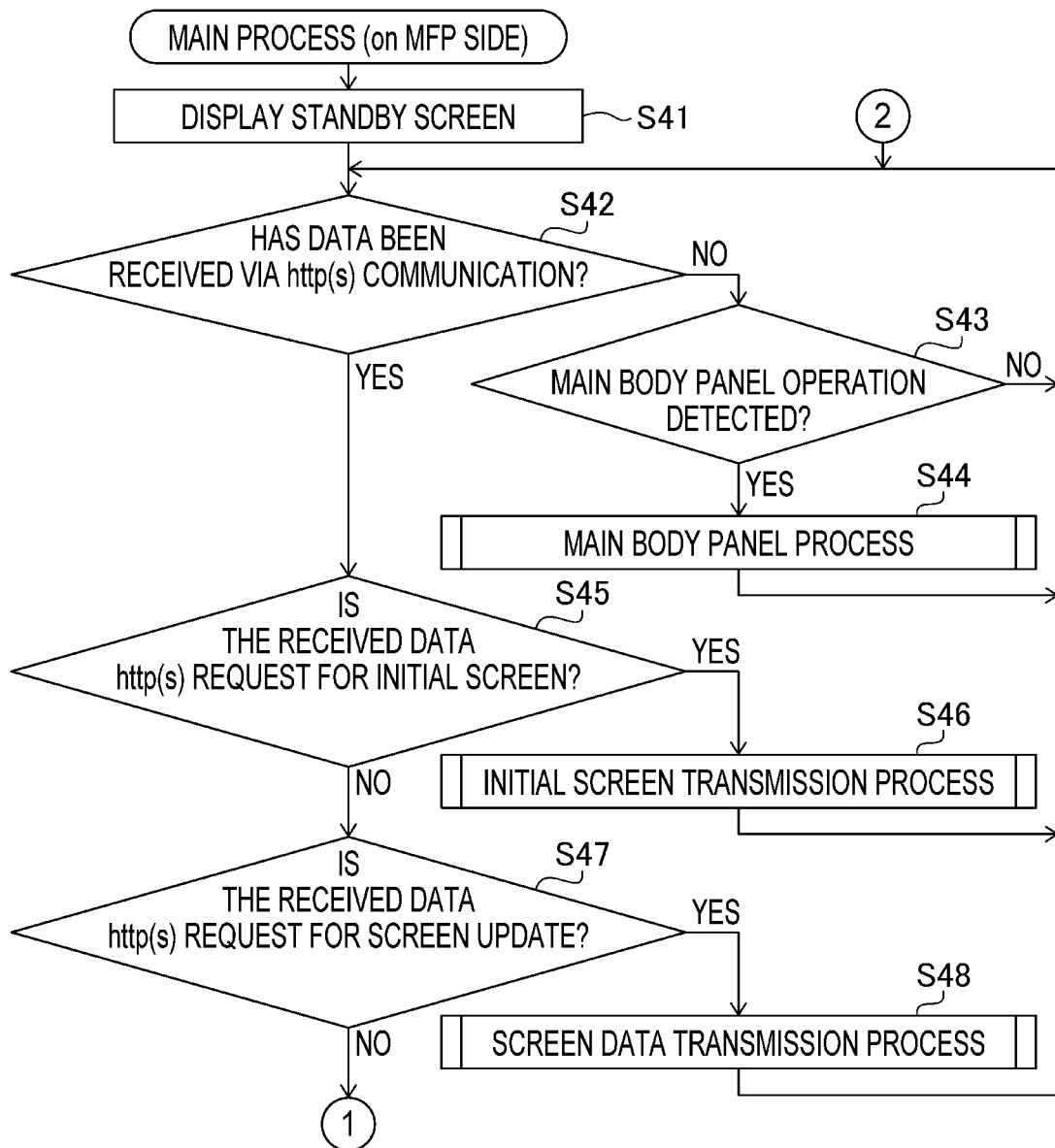
FIGS. 8A and 8B are flowcharts showing a procedure of a main process to be performed by a CPU of the MFP, in the first illustrative embodiment according to one or more aspects of the present disclosure.
Figure 8B:
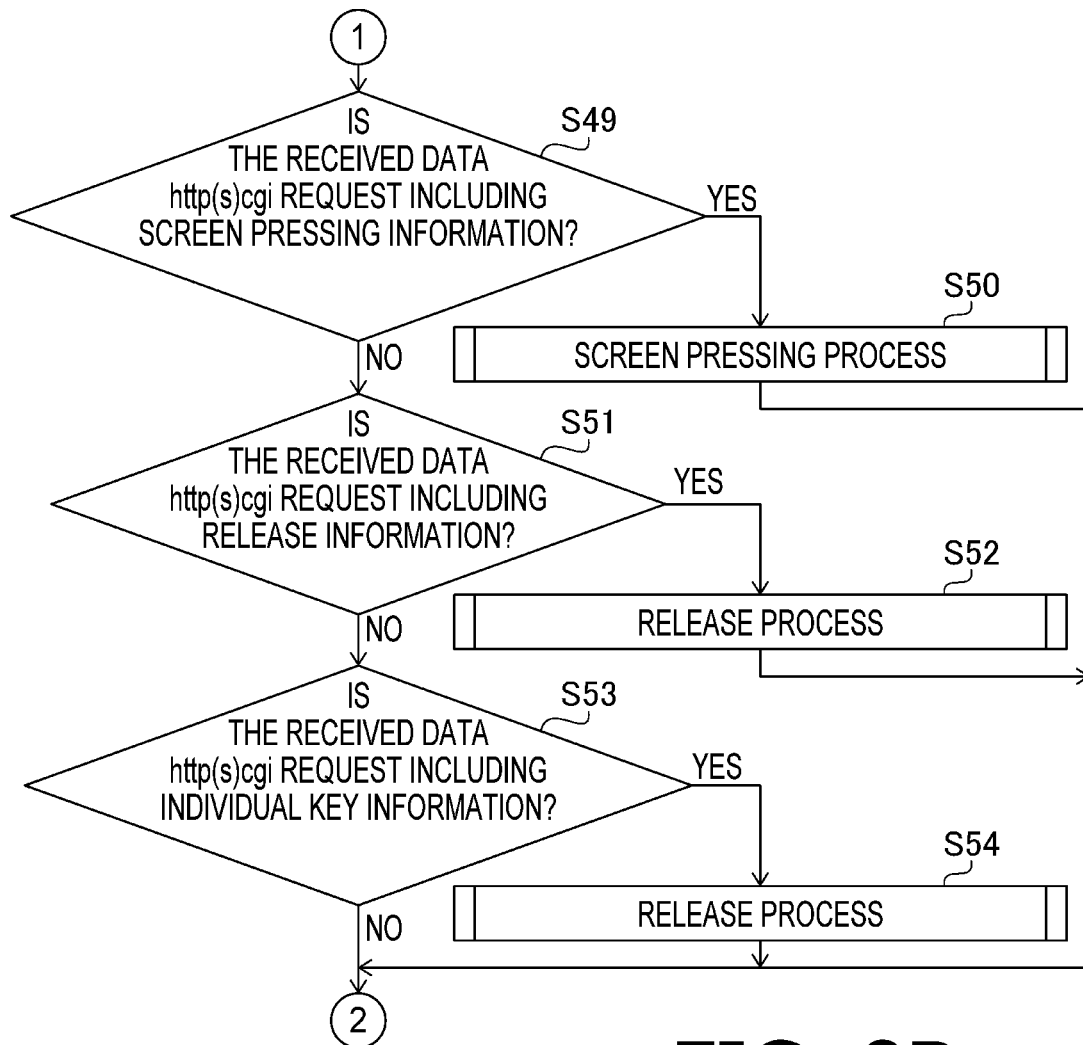

FIGS. 8A and 8B show a procedure of a main process by the CPU 101 of the MFP 100. In the main process shown in FIGS. 8A and 8B, the CPU 101 first displays a standby screen on the panel 105 (S41). For instance, the standby screen may be a screen similar to the panel display 105b shown in FIG. 3A.

Subsequently, the CPU 101 determines whether the CPU 101 has received data via http(s) communication (i.e., data communication according to an http(s) protocol) (S42). When determining that the CPU 101 has not received data via http(s) communication (S42: No), the CPU 101 determines whether a main body panel operation (i.e., a user operation to the panel 105 or the keys 106) has been detected (S43). When determining that a main body panel operation has been detected (S43: Yes), the CPU 101 performs a main body panel process (S44), and thereafter goes back to S42. Meanwhile, when determining that a main body panel operation has not been detected (S43: No), the CPU 101 goes back to S42 without executing S44.

Figure 9:
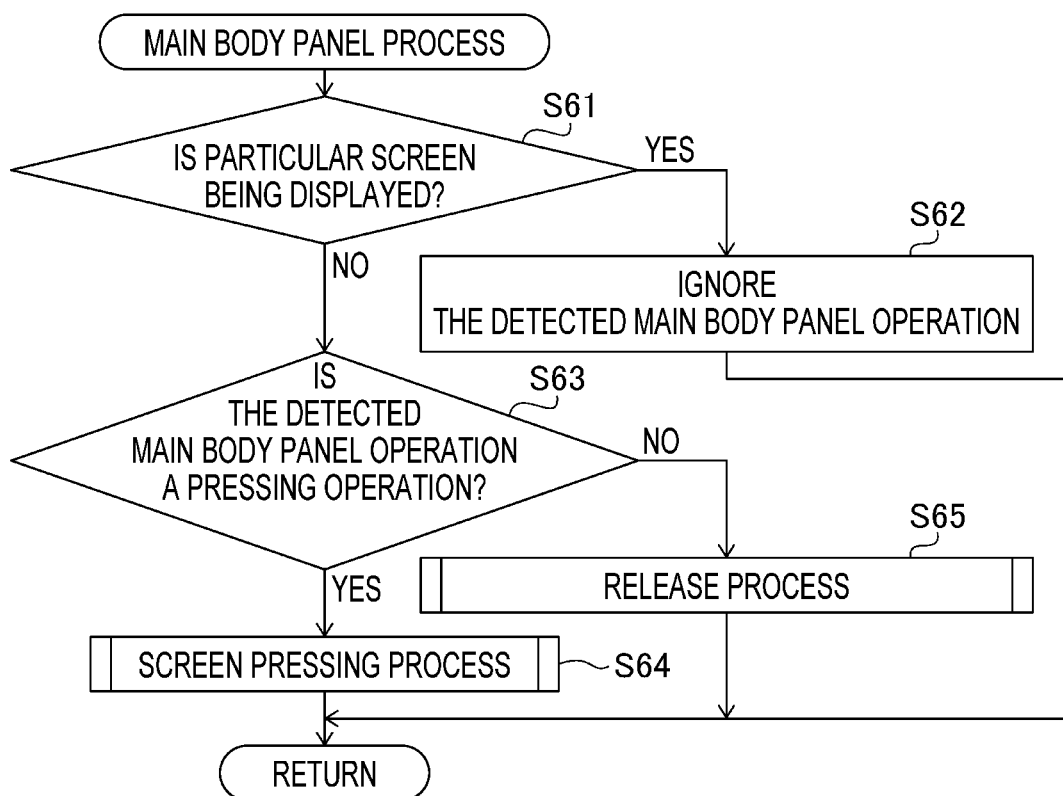
FIG. 9 is a flowchart showing a procedure of a main body panel process included in the main process shown in FIGS. 8A and 8B, in the first illustrative embodiment according to one or more aspects of the present disclosure.

FIG. 9 shows a detailed procedure of the main body panel process. In the main body panel process shown in FIG. 9, first, the CPU 101 determines whether a particular screen is being displayed on the panel 105 (S61). Examples of the particular screen may include, but are not limited to, the same screen as the panel display 105d (see FIG. 3B) immediately before the transition of the MFP 100 to the maintenance mode, and a screen after the transition of the MFP 100 to the maintenance mode. In other words, the same screen as the panel display 105d immediately before the transition and the screen after the transition may be defined as the particular screen. When determining that the particular screen is being displayed on the panel 105 (S61: Yes), the CPU 101 ignores the detected main body panel operation (S62). Thereafter, the CPU 101 terminates the main body panel process. Thus, when the particular screen is being displayed on the panel 105 (i.e., when the MFP 100 is in the maintenance mode or in the state immediately before the transition to the maintenance mode, even if the user operates the panel 105 or the keys 106, the operation is ignored without being accepted. Thus, when the MFP 100 is put in the maintenance mode by remote control, the user of the MFP 100 is prohibited from operating the panel 105 or the keys 106. Hence, it is possible to prevent the user of the MFP 100 from erroneously or intentionally changing the settings for the MFP 100 in the maintenance mode.

The determination of S61 may be changed to a determination as to whether the MFP 100 is being remotely operated. In this case, a user operation to the panel 105 or to the keys 106 while the MFP 100 is being remotely operated may be ignored. It may be determined that the MFP 100 is being remotely operated, based on the "Yes" button 105a1 having been pressed on the checking screen 105a (see FIG. 2C).

Meanwhile, when determining that the particular screen is not being displayed on the panel 105 (S61: No), the CPU 101 determines whether the detected main body panel operation is a pressing operation (S63). When determining that the detected main body panel operation is a pressing operation (S63: Yes), the CPU 101 performs a screen pressing process (S64). Thereafter, the CPU 101 terminates the main body panel process. Meanwhile, when determining that the detected main body panel operation is not a pressing operation (S63: No), the CPU 101 performs a release process (S65). Afterward, the CPU 101 terminates the main body panel process.

Figure 12:
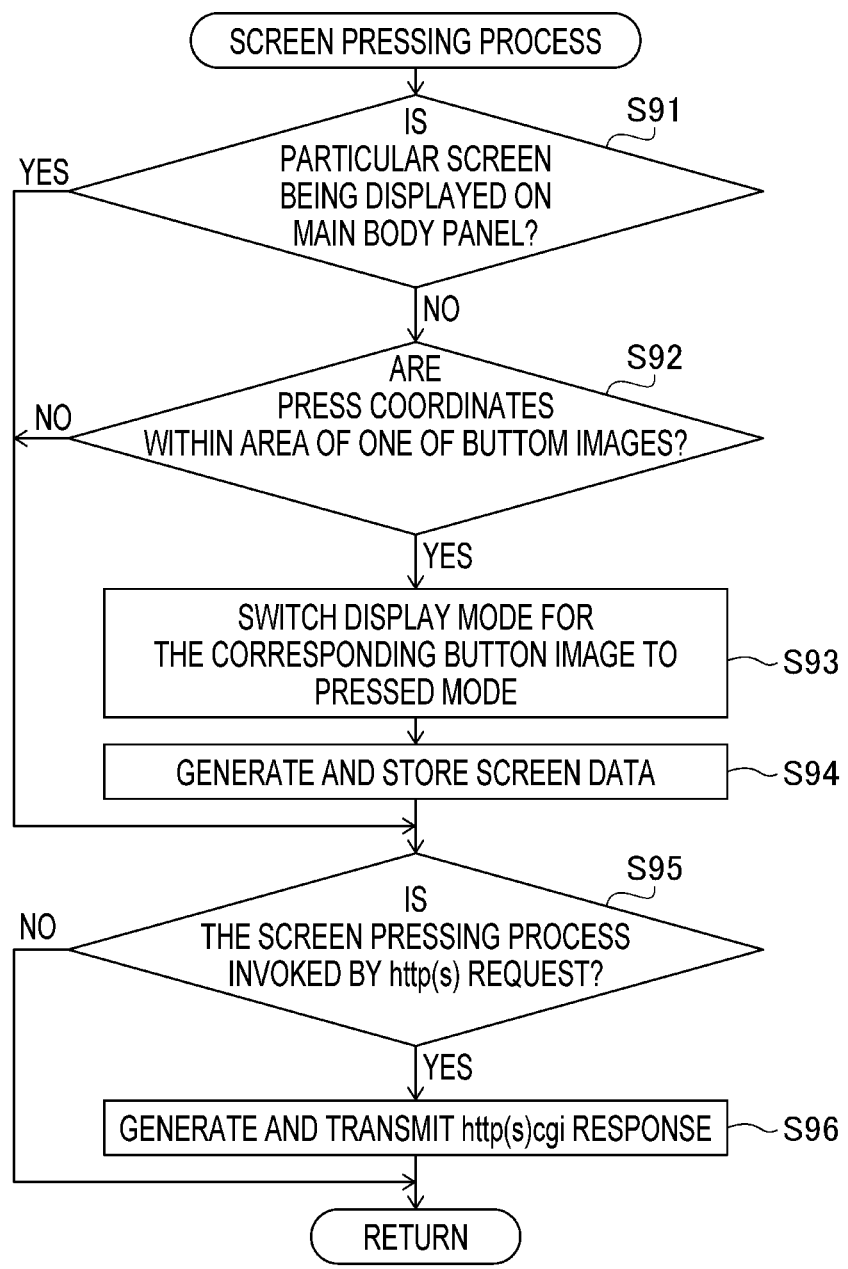
FIG. 12 is a flowchart showing a procedure of a screen pressing process included in the main process shown in FIGS. 8A and 8B, in the first illustrative embodiment according to one or more aspects of the present disclosure.

FIG. 12 shows a detailed procedure of the screen pressing process. In the screen pressing process shown in FIG. 12, first, the CPU 101 determines whether the screen being displayed on the main body panel (i.e., the panel 105) is the particular screen (S91). When determining that the screen being displayed on the main body panel is not the particular screen (S91: No), the CPU 101 determines whether the press coordinates are within an area of one of button images (S92). When determining that the press coordinates are within an area of one of the button images (S92: Yes), the CPU 101 switches a display mode for the corresponding button image to a pressed mode (S93). For instance, the button images may include, but are not limited to, object images corresponding to the icons (e.g., the "Fax" icon, the "Copy" icon, etc.) and the buttons (e.g., the "Basic 1" button, the "Custom 1" button, etc.) in the panel display 105b (see FIG. 3A). Further, for instance, "switching the display mode for the button image to the pressed mode" may denote switching the color of the button image from a color for a non-pressed mode (i.e., a normal mode) to a different color.

Next, the CPU 101 generates screen data and stores the generated screen data in the RAM 103 (S94). Thereafter, the CPU 101 goes to S95. The screen data stored in the RAM 103 is read out and used in a screen data transmission process that will be described below with reference to FIG. 11.

Meanwhile, when determining that the screen being displayed on the main body panel is the particular screen (S91: Yes), or when determining that the press coordinates are not within the area of any of the button images (S92: No), the CPU 101 skips S93 and S94 and proceeds to S95.

In S95, the CPU 101 determines whether the screen pressing process is invoked by an http(s) request. When determining that the screen pressing process is invoked by an http(s) request (S95: Yes), the CPU 101 transmits an http(s)cgi response (S96). Thereafter, the CPU 101 terminates the screen pressing process. The said http(s)cgi response is the http(s)cgi response to be received when the CPU 12 of the PC 10 performs the http(s)cgi request execution process in S5 (see FIG. 4). The http(s)cgi response includes information indicating which http(s) request the http(s)cgi response is a response to.

Meanwhile, when determining that the screen pressing process is not invoked by an http(s) request (S95: No), the CPU 101 terminates the screen pressing process without executing S96.

The screen pressing process is invoked not only in S64 of the main body panel process in S44, but also in a below-mentioned step S48. Therefore, processing contents of the screen pressing process are versatilely created. Specifically, the determination of S91, the determination of S95, and the processing in S96 are unnecessary when the screen pressing process is invoked in S64, but are necessary when the screen pressing process is invoked in S48.

The release process in S65 is invoked not only in S65 but also in S52 and S54 (see FIG. 8B). Therefore, processing contents of the release process are versatilely created, similarly to the screen pressing process. Prior to a detailed explanation of the release process with reference to FIGS. 13A and 13B, S45 and the following steps in the main process (see FIGS. 8A and 8B) by the MFP 100 will be described.

When determining that the CPU 101 has received data via http(s) communication (S42: Yes), the CPU 101 determines whether the data received via the http(s) communication is an http(s) request for the initial screen (S45). When determining that the data received via the http(s) communication is the http(s) request for the initial screen (S45: Yes), the CPU 101 performs an initial screen transmission process (S46). Thereafter, the CPU 101 goes back to S42.

Figure 10:
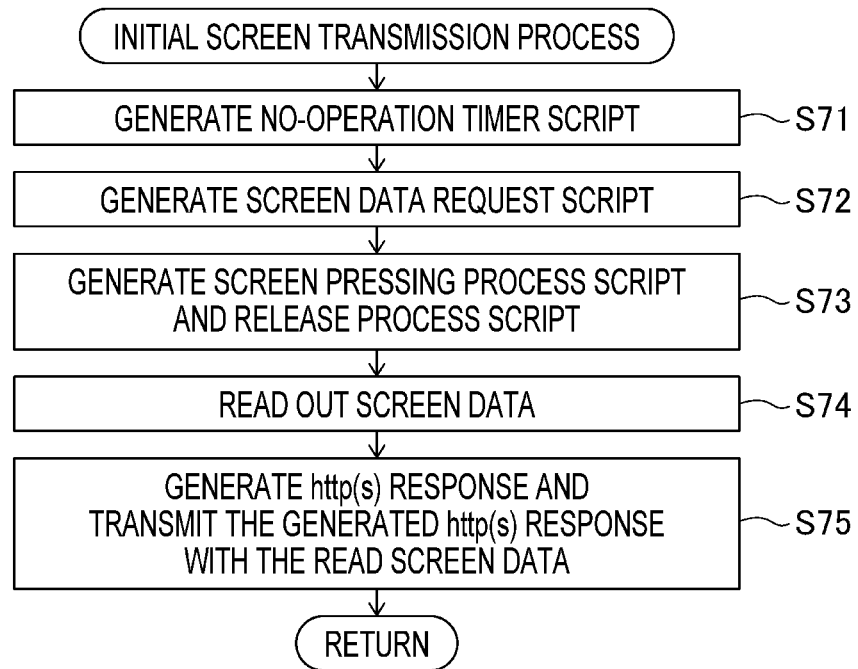
FIG. 10 is a flowchart showing a procedure of an initial screen transmission process included in the main process shown in FIGS. 8A and 8B, in the first illustrative embodiment according to one or more aspects of the present disclosure.

FIG. 10 shows a detailed procedure of the initial screen transmission process. In the initial screen transmission process shown in FIG. 10, first, the CPU 101 generates the no-operation timer script (S71). The no-operation timer script is a program for causing the browser to operate the no-operation timer and perform, for instance, the screen update process in S3.

Next, the CPU 101 generates the screen data request script (S72). The screen data request script is a program for causing the browser to perform a screen data request process and generate an http(s) request including a screen data request (e.g., the http(s) request for screen update that is transmitted in S21).

Subsequently, the CPU 101 generates a screen pressing process script and a release process script (S73). The screen pressing process script is a program for causing the browser to perform a screen pressing process and perform, for instance, the determination of S4, and the processes of S31 to S33 in the http(s)cgi request execution process (see FIG. 7) to be performed in S5 when the determination of S4 is affirmative (i.e., S4: Yes). Further, the release process script is a program for causing the browser to perform a release process and perform, for instance, the determination of S6, and the processes of S31 to S33 in the http(s)cgi request execution process to be performed in S7 when the determination of S6 is affirmative (i.e., S6: Yes).

Next, the CPU 101 reads out screen data (S74). The screen data is screen data of the screen being currently displayed on the panel 105 of the MFP 100. To display a screen on the panel 105, the MFP 100 generates screen data of the screen, stores the generated screen data in the RAM 103, reads out the screen data from the RAM 103, and displays on the panel 105 the screen based on the screen data. Accordingly, in S74, the CPU 101 reads out the screen data from the RAM 103.

Subsequently, the CPU 101 generates an http(s) response, and transmits the generated http(s) response with the read screen data (S75). Thereafter, the CPU 101 terminates the initial screen transmission process. The http(s) response is a response to the http(s) request for the initial screen as transmitted in S11 (see FIG. 5). The http(s) response includes the scripts generated in S71 to S73 and information representing that the screen data is transmitted together with the http(s) response.

Referring back to FIGS. 8A and 8B, when determining in S45 that the data received via the http(s) communication is not the http(s) request for the initial screen (S45: No), the CPU 101 determines whether the data received via the http(s) communication is an http(s) request for screen update (S47). When determining that the data received via the http(s) communication is the http(s) request for screen update (S47: Yes), the CPU 101 performs a screen data transmission process (S48). Afterward, the CPU 101 goes back to S42.

Figure 11:
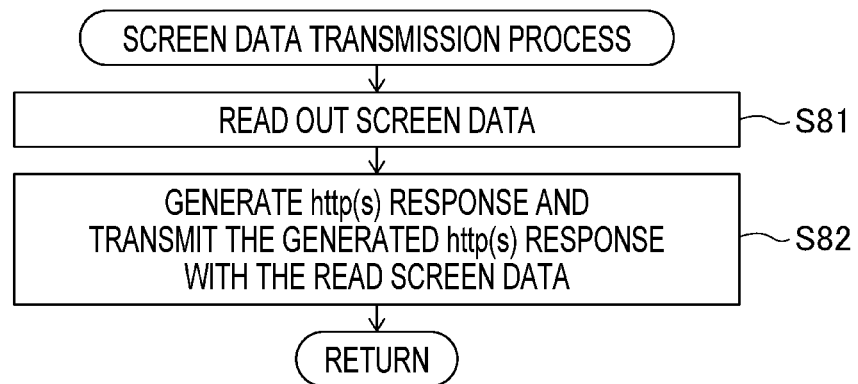
FIG. 11 is a flowchart showing a procedure of a screen data transmission process included in the main process shown in FIGS. 8A and 8B, in the first illustrative embodiment according to one or more aspects of the present disclosure.

FIG. 11 shows a detailed procedure of the screen data transmission process. In the screen data transmission process shown in FIG. 11, first, the CPU 101 reads out screen data (S81). Specifically, in S81, the CPU 101 reads out the screen data stored in the RAM 103 in the aforementioned step S94 (see FIG. 12) or screen data stored in the RAM 103 in a below-mentioned step S104 (see FIG. 13B).

Next, the CPU 101 generates an http(s) response and transmits the generated http(s) response with the read screen data (S82). Thereafter, the CPU 101 terminates the screen data transmission process. The process of S82 is different from the process of S75 only in that the http(s) response is a response to the http(s) request for screen update as transmitted in S21 (see FIG. 6). Therefore, a further explanation of the process of S82 is omitted.

Referring back to FIGS. 8A and 8B, when determining that the data received via the http(s) communication is not the http(s) request for screen update (S47: No), the CPU 101 determines whether the data received via the http(s) communication is an http(s)cgi request including the screen pressing information (S49). When determining that the data received via the http(s) communication is the http(s)cgi request including the screen pressing information (S49: Yes), the CPU 101 performs the screen pressing process (S50). Thereafter, the CPU 101 goes back to S42. The screen pressing process has been described in detail as the process of S64 included in the main body panel process in S44. Hence, a further explanation of the screen pressing process is omitted.

When determining in S49 that the data received via the http(s) communication is not the http(s)cgi request including the screen pressing information (S49: No), the CPU 101 determines whether the data received via the http(s) communication is an http(s)cgi request including the release information (S51). When determining that the data received via the http(s) communication is the http(s)cgi request including the release information (S51: Yes), the CPU 101 performs the release process (S52). Afterward, the CPU 101 goes back to S42.

Meanwhile, when determining in S51 that the data received via the http(s) communication is not the http(s)cgi request including the release information (S51: No), the CPU 101 determines whether the data received via the http(s) communication is an http(s)cgi request including the individual key information (S53). When determining that the data received via the http(s) communication is the http(s)cgi request including the individual key information (S53: Yes), the CPU 101 performs the release process (S54). Afterward, the CPU 101 goes back to S42.

Meanwhile, when determining in S53 that the data received via the http(s) communication is not the http(s)cgi request including the individual key information (S53: No), the CPU 101 goes back to S42.

Figure 13A:
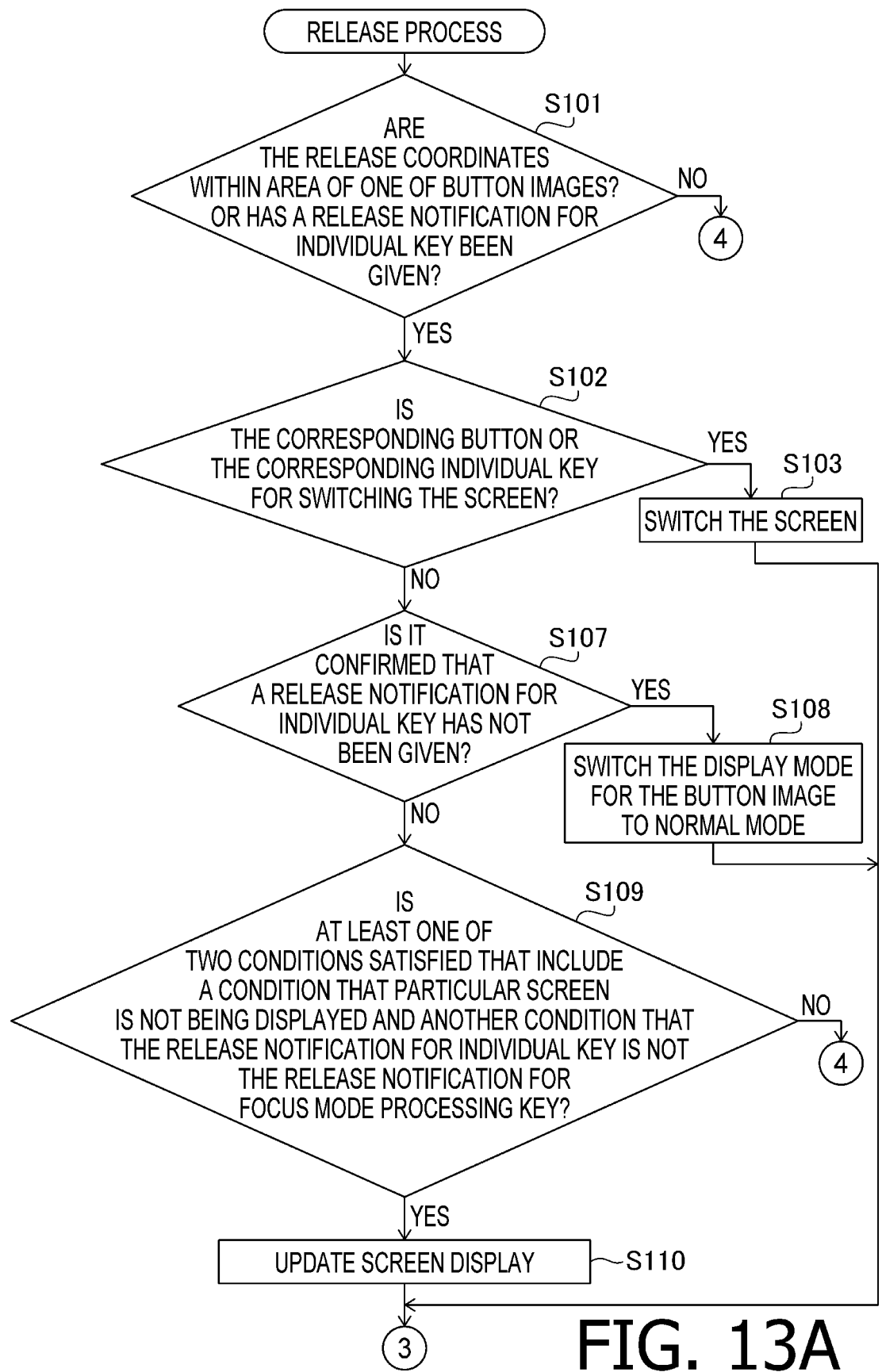
FIGS. 13A and 13B are flowcharts showing a procedure of a release process included in the main process shown in FIGS. 8A and 8B, in the first illustrative embodiment according to one or more aspects of the present disclosure.
Figure 13B:
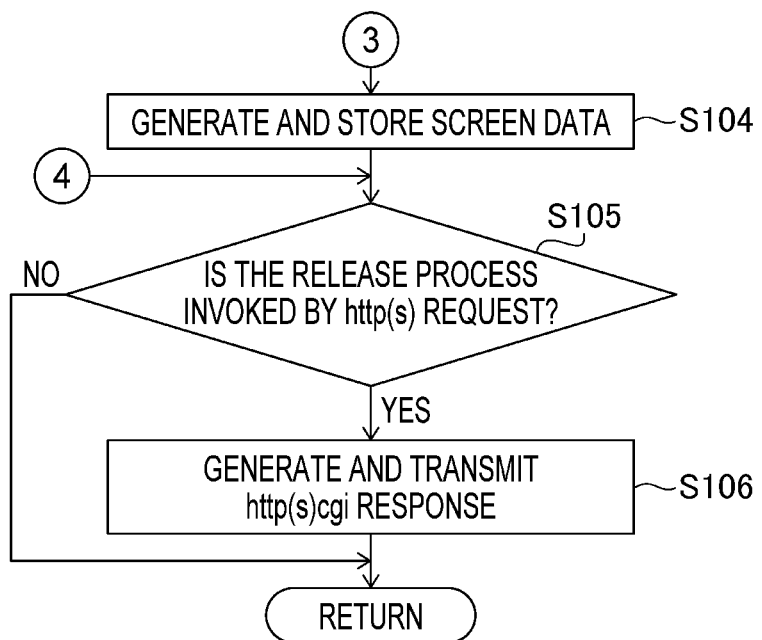

FIGS. 13A and 13B show a detailed procedure of the release process. In the release process shown in FIGS. 13A and 13B, the CPU 101 first determines whether the release coordinates are within an area of one of the button images or whether a release notification for an individual key has been given (S101). When determining in S101 that at least one of two conditions is satisfied that include a condition that the release coordinates are within an area of one of the button images and another condition that a release notification for an individual key has been given (S101: Yes), the CPU 101 determines whether a button associated with the corresponding button image, or the corresponding individual key is for switching the screen (S102). When determining in S102 that the button associated with the corresponding button image, or the corresponding individual key is for switching the screen (S102: Yes), the CPU 101 switches the screen being displayed on the panel 105 to a screen associated with the button or the individual key (S103). Thereafter, the CPU 101 proceeds to S104. Specifically, examples of the object (e.g., buttons) for switching the screen may include, but are not limited to, the "Fax" icon in a case where the same screen as the panel display 105b (see FIG. 3A) is displayed on the panel 105. When the "Fax" icon is pressed, the screen on the panel 105 is switched to a screen displaying an operation panel for "Fax." Further, the examples of the object (e.g., individual keys) for switching the screen may include, but are not limited to, a "HOME" key.

In S104, the CPU 101 generates screen data for displaying on the "Remote Panel" the same screen as displayed on the panel 105 and stores the generated screen data in the RAM 103 in substantially the same manner as in S94. Thus, for instance, when the "Fax" icon on the panel 105 is pressed, and the screen on the panel 105 is switched to the screen displaying the operation panel for "Fax," screen data for displaying the screen of the operation panel for "Fax" on the "Remote Panel" is generated and stored in the RAM 103.

Next, the CPU 101 determines whether the release process is invoked by an http(s) request (S105). When determining that the release process is invoked by an http(s) request (S105: Yes), the CPU 101 generates and transmits an http(s)cgi response (S106). Thereafter, the CPU 101 terminates the release process. The http(s)cgi response is the http(s)cgi response to be received when the CPU 12 of the PC 10 performs the http(s)cgi request execution process in S7 (see FIG. 4). The http(s)cgi response includes information indicating which http(s) request the http(s)cgi response is a response to.

Meanwhile, when determining in S105 that the release process is not invoked by an http(s) request (S105: No), the CPU 101 terminates the release process without executing S106.

Meanwhile, when determining in S102 that the button associated with the corresponding button image is not for switching the screen and that the corresponding individual key is not for switching the screen (S102: No), the CPU 101 determines whether it is confirmed that a release notification for an individual key has not been given (S107). When it is confirmed that a release notification for an individual key has not been given (S107: Yes), i.e., when the button associated with the corresponding button image is not a button for switching the screen, the CPU 101 switches the display mode for the button image to a normal mode (S108). Afterward, the CPU 101 proceeds to S104. Thereby, the display mode for the button image of the released button is switched from the pressed mode to the normal mode on the panel 105.

Then, the CPU 101 performs the processes of S104 to S106. Afterward, the CPU 101 terminates the release process. When the CPU 101 proceeds to S106 via S108, S104, and S105, the CPU 101 generates and transmits an http(s)cgi response, which is the http(s)cgi response to be received when the CPU 12 of the PC 10 performs the http(s)cgi request execution process in S5 (see FIG. 4), in substantially the same manner as when the CPU 101 proceeds to S106 via S103, S104, and S105.

Meanwhile, when determining in S107 that it is confirmed that a release notification for an individual key has been given (S107: No), the CPU 101 determines whether at least one of two conditions is satisfied that include a condition that the particular screen is not being displayed on the panel 105 and another condition that the release notification for an individual key is not the release notification for a focus mode processing key (S109). When determining in S109 that at least one of the two conditions is satisfied (S109: Yes), the CPU 101 updates the screen display (S110). Thereafter, the CPU 101 proceeds to S104. Examples of the focus mode processing key may include, but are not limited to, a start key, a movement key, a determination key, and an end key. Specifically, for instance, in the key display 105c, the "HOME" key corresponds to the start key, a "#" key corresponds to a forward movement key, an "*" key corresponds to a backward movement key, a "0" key corresponds to the determination key, and a "BACK" key corresponds to the end key. The focus mode is a mode in which one of the keys in the software keyboard 105d2 is displayed in a selected state, and a process to be performed when the key in the selected state is pressed is performed in response to an operation to the determination key.

Then, the CPU 101 performs the processes of S104 to S106. Afterward, the CPU 101 terminates the release process. When the CPU 101 proceeds to S106 via S110, S104, and S105, the CPU 101 generates and transmits an http(s)cgi response, which is the http(s)cgi response to be received when the CPU 12 of the PC 10 performs the http(s)cgi request execution process in S9 (see FIG. 4), unlike when the CPU 101 proceeds to S106 via S103, S104, and S105.

Meanwhile, in S109, when determining that the particular screen is being displayed on the panel 105 and that the release notification for an individual key is the release notification for a focus mode processing key (S109: No), the CPU 101 skips S110 and S104, and proceeds to S105. In this case, the screen displayed on the panel 105 does not change. On the particular screen, it has to be prevented to let the third party other than the administrator see, on the panel 105, how the MFP 100 is remotely controlled using the focus mode processing key. Therefore, the screen displayed on the panel 105 does not change even if the focus mode processing key is operated.

Then, the CPU 101 performs the processes of S105 and S106. Afterward, the CPU 101 terminates the release process. When the CPU 101 proceeds from S109 to S106 via S105 without executing S110 or S104, the CPU 101 generates and transmits an http(s)cgi response, which is not transmitted together with image data, unlike when the CPU 101 proceeds to S106 via S110, S104, and S105. Thereby, on the "Remote Panel" in the maintenance mode as well, it is not displayed how the MFP 100 is remotely operated using the focus mode processing key.

Meanwhile, when determining in S101 that none of the two conditions is satisfied that include the condition that the release coordinates are within an area of one of the button images and the said another condition that a release notification for an individual key has been given (S101: No), the CPU 101 proceeds to S105.

Thus, when the particular screen is being displayed in the detail pane 184 as shown in FIG. 3B, if the administrator presses the software keyboard 105d2 in an attempt to enter the password in the password entry field 105d1, the display mode for each pressed key is not switched to the pressed mode. This is because the CPU 101 makes an affirmative determination in S91 (i.e., S91: Yes) and skips S93, in the screen pressing process (see FIG. 12). On the panel 105 of the MFP 100 as well, the same display as in the detail pane 184 is shown. Therefore, the display mode for each pressed key is not switched to the pressed mode.

However, since the input process for the pressed keys is accepted, the input password is entered into the password entry field 105d1. Nonetheless, the password in the password entry field 105d1 is hidden, for instance, to be overwritten with "*."

Further, when the particular screen is the "Remote Panel" for the maintenance mode after transition from the "Remote Panel" for authentication, a display restriction is imposed on the software keyboard 105d2 in such a manner that the display mode for the software keyboard 105d2 is left unchanged. However, in this case, even the administrator may not be sure which key has been pressed or whether the intended key has been pressed correctly. Therefore, the display restriction may be lifted for the software keyboard 105d2 in the detail pane 184. Further, the display restriction may be maintained for the software keyboard on the panel 105. In this case, for instance, the software keyboard 105d2 in the detail pane 184 may be configured to be set selectively by the administrator between a mode in which the display restriction is not cancelled and a mode in which the display restriction is cancelled. Furthermore, on the MFP 100 side as well, the software keyboard on the panel 105 may be set according to an instruction from the administrator, selectively between a mode in which the display restriction is not cancelled and a mode in which the display restriction is cancelled.

When the particular screen is being displayed on the panel 105 of the MFP 100, even if there is a user operation to the panel 105 or the keys 106, the user operation is ignored. This is because the CPU 101 makes an affirmative determination in S61 (i.e., S61: Yes) in the main body panel process (see FIG. 9) and performs the process of S62.

As described above, the MFP 100 of the first illustrative embodiment includes the network I/F 108, the panel 105, and the CPU 101. When the MFP 100 is remotely connected with the PC 10 via the network I/F 108, the CPU 101 transmits to the PC 10 screen data for causing the PC 10 to display substantially the same screen as the display screen being displayed on the panel 105, receives remote access from the PC 10, and perform display processing for the display screen in accordance with the remote access. In this case, if the CPU 101 receives the remote access when the display screen is the particular screen (i.e., while the particular screen is being displayed as the display screen on the panel 105), the CPU 101 imposes a display restriction on the display screen.

Thus, the MFP 100 of the first illustrative embodiment is configured to impose the display restriction when the particular screen is being displayed on the panel 105.

Second Illustrative Embodiment

Next, an image forming system of a second illustrative embodiment according to aspects of the present disclosure will be described with reference to FIGS. 14 to 16. The image forming system of the second illustrative embodiment is different, only in part of control processing, from the image forming system 1 of the aforementioned first illustrative embodiment. Therefore, the control configuration of the image forming system 1 of the first illustrative embodiment will be employed as is, for the image forming system of the second illustrative embodiment.

Figure 14A:
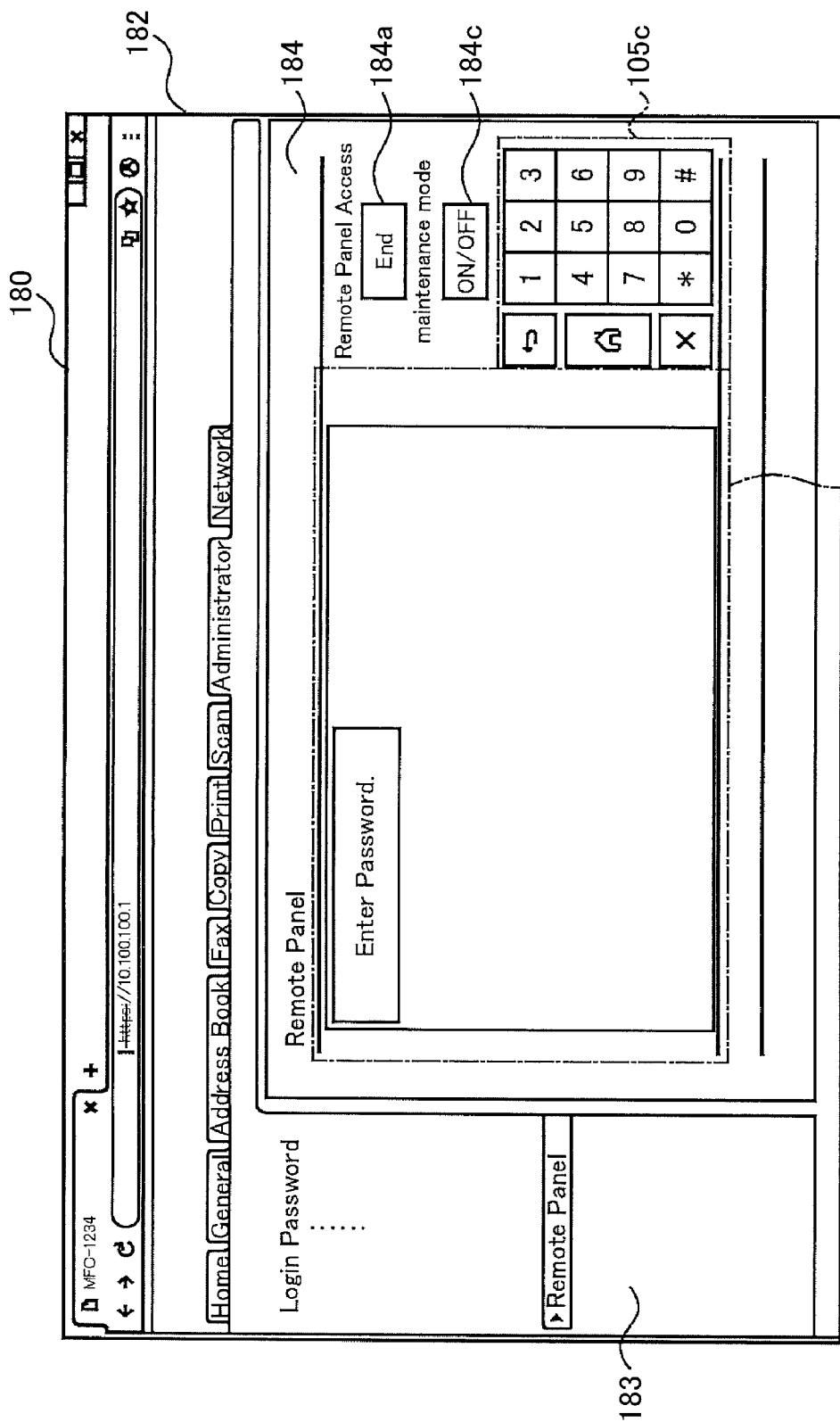
FIG. 14A shows an example of a display screen on the browser executed on the PC, in a second illustrative embodiment according to one or more aspects of the present disclosure.

FIG. 14A shows an example of a display of the detail pane 184 of the browser activated on the PC 10 included in the image forming system 1 of the second illustrative embodiment. In the detail pane 184 shown in FIG. 14A, a "Remote Panel" for authentication to make a transition to the maintenance mode is displayed, in substantially the same manner as in the detail pane 184 shown in FIG. 3B.

However, on the "Remote Panel" for authentication in FIG. 14A, a display mode for the panel display 105d' is different from the display mode for the panel display 105d on the "Remote Panel" for authentication in FIG. 3B. Specifically, on the panel display 105d', the software keyboard 105d2 in the panel display 105d in FIG. 3B is not displayed, but only the password input column 105d1 is displayed. Therefore, the password is entered into the password entry field 105d1 using the keys in the key display 105c.

Figure 14B:
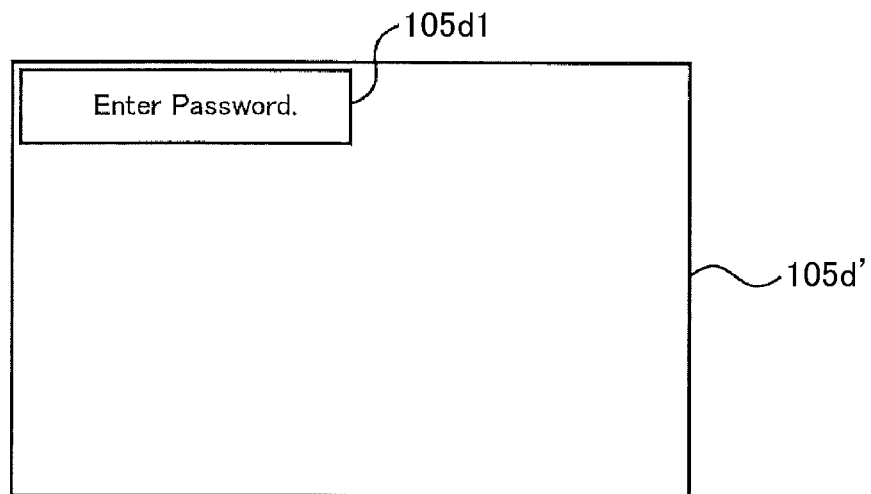
FIGS. 14B and 14C show examples of a display screen on the panel of the MFP, in the second illustrative embodiment according to one or more aspects of the present disclosure.

The panel display 105d' in the detail pane 184 is displayed as is on the panel 105 of the MFP 100 as well. FIG. 14B shows the panel display 105d' on the panel 105 of MFP 100.

Next, control processing by the image forming system 1 of the second illustrative embodiment will be described. The control processing of the second illustrative embodiment is different from the control processing of the aforementioned first illustrative embodiment only in part of the screen pressing process and the release process performed by the CPU 101 of the MFP 100. Accordingly, the other processes included in the control processing of the first illustrative embodiment (specifically, the processes shown in FIGS. 4 to 11) will be applied as are to the second illustrative embodiment as well.

Figure 15:
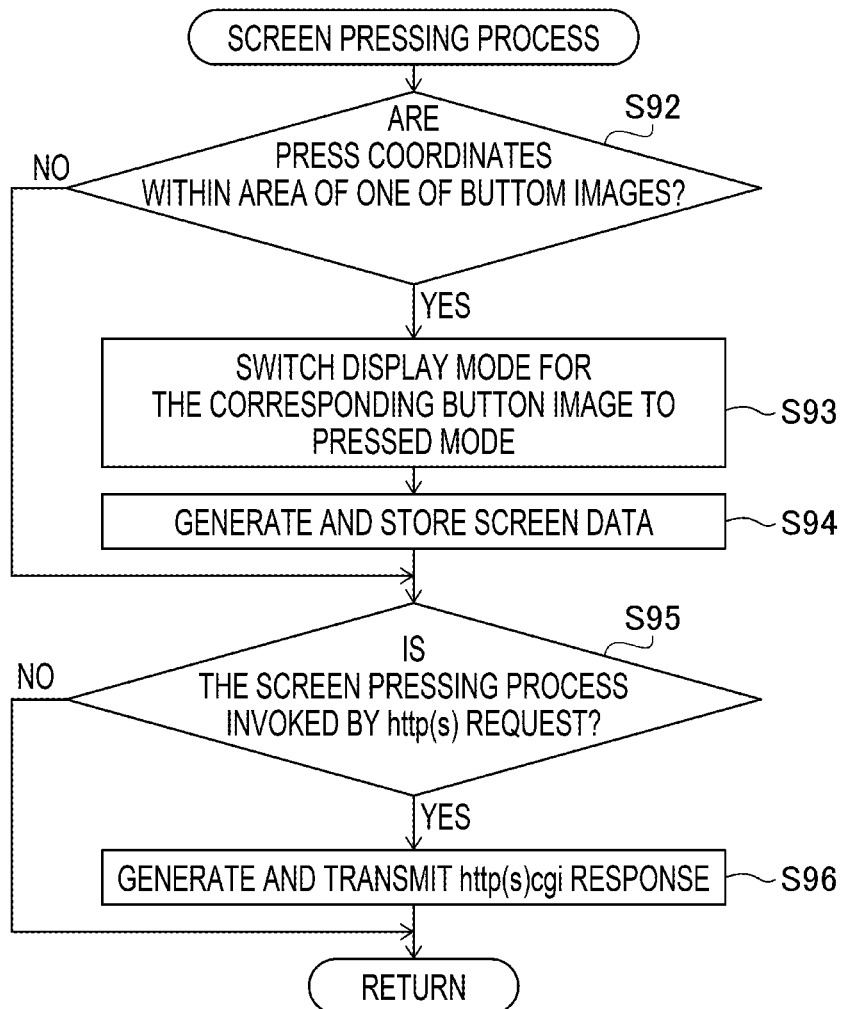
FIG. 15 is a flowchart showing a procedure of a screen pressing process included in the main process to be performed by the CPU of the MFP, in the second illustrative embodiment according to one or more aspects of the present disclosure.

FIG. 15 shows a detailed procedure of a screen pressing process to be performed by the CPU 101 of the MFP 100 in the second illustrative embodiment. The screen pressing process shown in FIG. 15 is configured by removing the determination of S91 from the screen pressing process shown in FIG. 12. This is because, in the second illustrative embodiment, there is no need to change the display mode for button images since no button images are displayed on the particular screen when the particular screen is being displayed in the detail pane 184 and on the panel 105. Thus, the determination of S 91 (see FIG. 12) is removed.

Figure 16A:
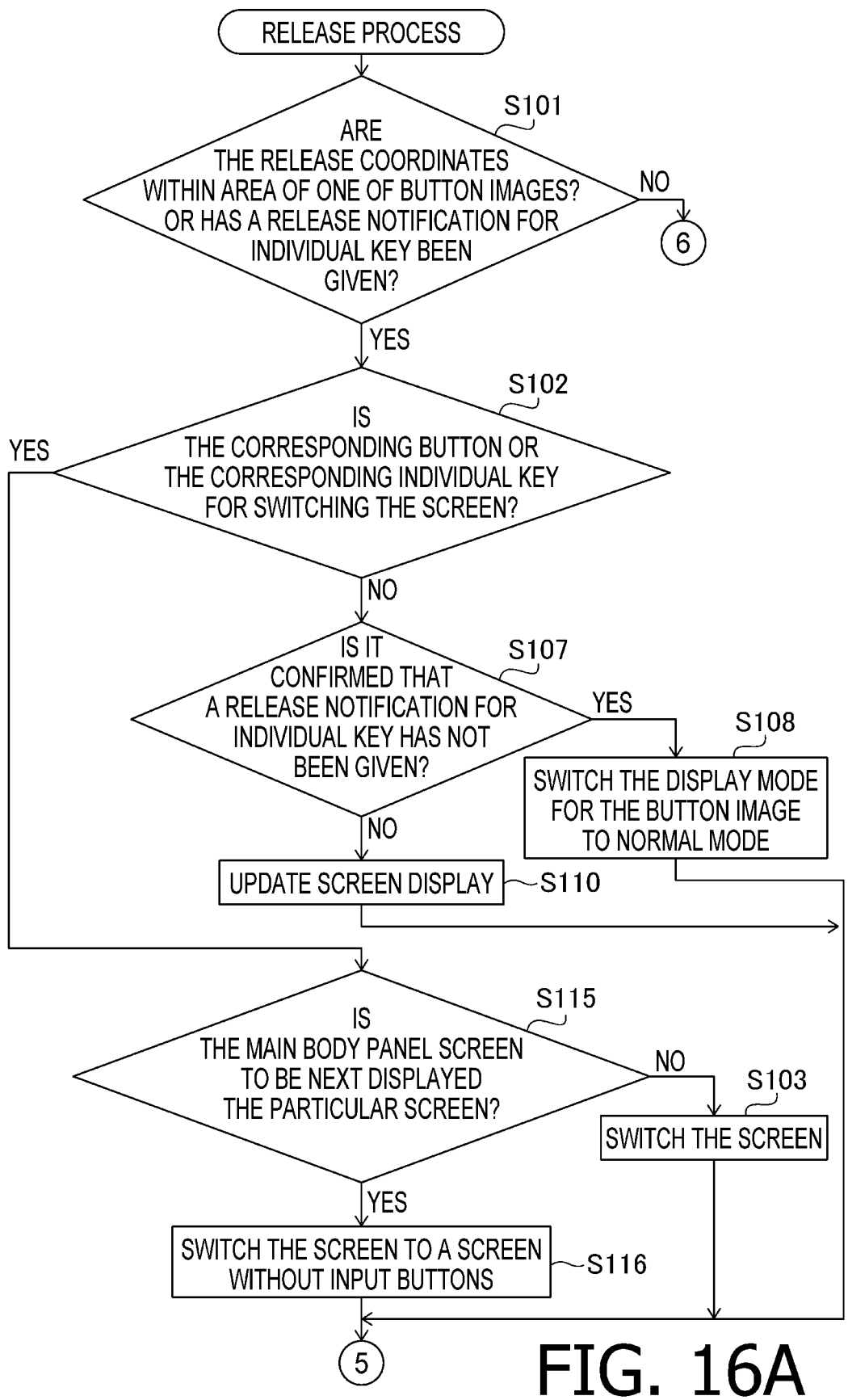
FIGS. 16A and 16B are flowcharts showing a procedure of a release process included in the main process to be performed by the CPU of the MFP, in the second illustrative embodiment according to one or more aspects of the present disclosure.
Figure 16B:
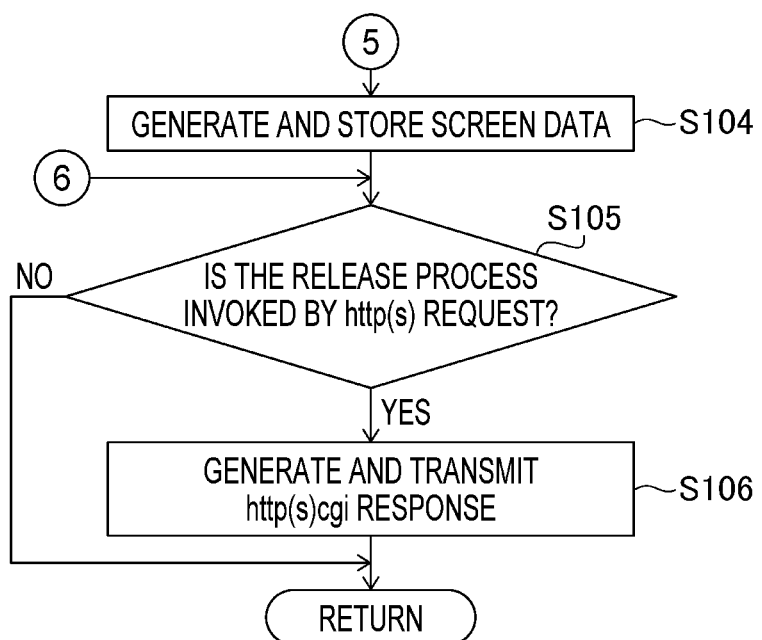

FIGS. 16A and 16B show a detailed procedure of a release process to be performed by the CPU 101 of the MFP 100 in the second illustrative embodiment. The release process shown in FIGS. 16A and 16B is configured by removing the determination of S109 from the release process shown in FIGS. 13A and 13B and adding a determination of S115 and a process of S116 to the release process shown in FIGS. 13A and 13B. A reason for removing S109 is that no button images are displayed on the particular screen. Further, a reason for adding S115 after S102 is that when the main body panel screen to be next displayed is the particular screen (i.e., in a case of "S115: Yes"), the screen displayed on the panel 105 at the time of the determination of S102 needs to be switched to a screen (i.e., the same screen as the panel display 105d' shown in FIGS. 14A and 14B) without input buttons.

Thus, in the second illustrative embodiment, when the particular screen is being displayed on the panel 105 of the MFP 100, the screen is switched to the same screen as the panel display 105d' without input buttons, on the panel 105 as well as in the detail pane 184. Therefore, it is impossible for the third party other than the administrator to follow a change in the display mode for each of the operated keys and know the password. Thus, since there is no risk for confidential information on the MFP 100 to leak to the third party other than the administrator, it is possible to achieve improved security of the confidential information on the MFP 100.

Next, an image forming system 1 in a modification of the second illustrative embodiment will be described. In the modification, the display screen on the panel 105 of the MFP 100 varies between when the MFP 100 is remotely connected with the PC 10 and when the MFP 100 is not remotely connected with the PC 10.

Figure 14C:
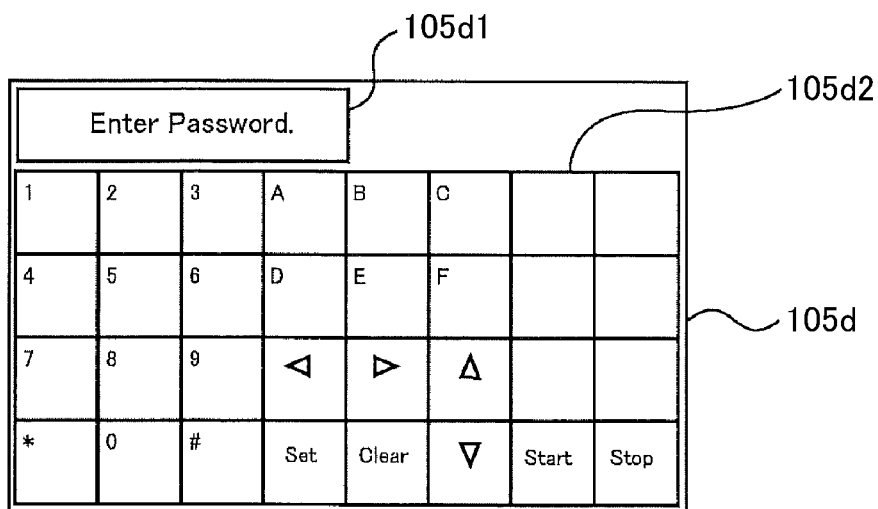

FIG. 14C shows an example of the panel display 105b for authentication to shift the MFP 100 into the maintenance mode when the MFP 100 is not remotely connected with the PC 10. The MFP 100 is configured to, when directly operated, transition into the maintenance mode, regardless of whether the MFP 100 is externally accessed from the PC 10. The panel display 105b for authentication as shown in FIG. 14C is an authentication screen displayed on the panel 105 for the administrator to directly operate the MFP 100 to shift the MFP 100 into the maintenance mode. In other words, when the MFP 100 is not remotely connected with the PC 10, the software keyboard 105d2 is displayed in the panel display 105b for authentication on the panel 105. In this case, when the software keyboard 105d2 is operated, the display mode for the operated key changes.

Thus, in the modification of the second illustrative embodiment, the MFP 100 includes the network I/F 108, the panel 105, and the CPU 101. When the MFP 100 is remotely connected with the PC 10 via the network IF 108, the CPU 101 transmits to the PC 10 screen data for causing the PC 10 to display substantially the same screen as the panel display 105d being displayed on the panel 105. Then, the CPU 101 receives remote access from the PC 10, and perform display processing for the panel display 105d in accordance with the remote access. Further, when the MFP 100 is not remotely connected with the PC 10 via the network I/F 108, the CPU 101 displays on the panel 105 the panel display 105d (hereinafter, which may be referred to as a "first screen 105d") that is the particular screen. Meanwhile, when the MFP 100 is remotely connected with the PC 10 via the network I/F 108, instead of the first screen 105d, the CPU 101 displays on the panel 105 the panel display 105d' (hereinafter, which may be referred to as a "second screen 105d'") for which a display mode is different from a display mode for the first screen 105d.

When the MFP 100 is not remotely connected with the PC 10, the administrator operates the MFP 100 directly in front of the MFP 100. Hence, there is no risk for confidential information on the MFP 100 to leak to the third party other than the administrator. Therefore, in the modification of the third illustrative embodiment, the display screen on the panel 105 is changed between when the MFP 100 is remotely connected with the PC 10 and when the MFP 100 is not remotely connected with the PC 10. Thereby, the MFP 100 is configured to, when not remotely connected with the PC 10, display on the panel 105 the screen (e.g., the first screen 105d shown in FIG. 14C) that is easier for the administrator to operate. Thus, it is possible to improve the operability for the administrator to operate the MFP 100.

Third Illustrative Embodiment

Subsequently, an image forming system of a third illustrative embodiment according to aspects of the present disclosure will be described with reference to FIGS. 17 to 20. The image forming system of the third illustrative embodiment is different, only in part of control processing, from the image forming system 1 of the aforementioned first illustrative embodiment. Therefore, the control configuration of the image forming system 1 of the first illustrative embodiment will be employed as is, for the image forming system of the second illustrative embodiment.

In the image forming system 1 of the third illustrative embodiment, while the particular screen is being displayed on the panel 105 of the MFP 100, a backlight of the panel 105 is turned off so as not to allow the third party other than the administrator to see information displayed on the panel 105.

The image forming system 1 of the third illustrative embodiment is configured by partially modifying the main process on the PC 10 side and the main process on the MFP 100 side in the image forming system 1 of the aforementioned first illustrative embodiment. Therefore, with respect to each of substantially the same processes as performed in the image forming system 1 of the first illustrative embodiment, the same reference character will be provided thereto, and an explanation thereof will be omitted.

Figure 17:
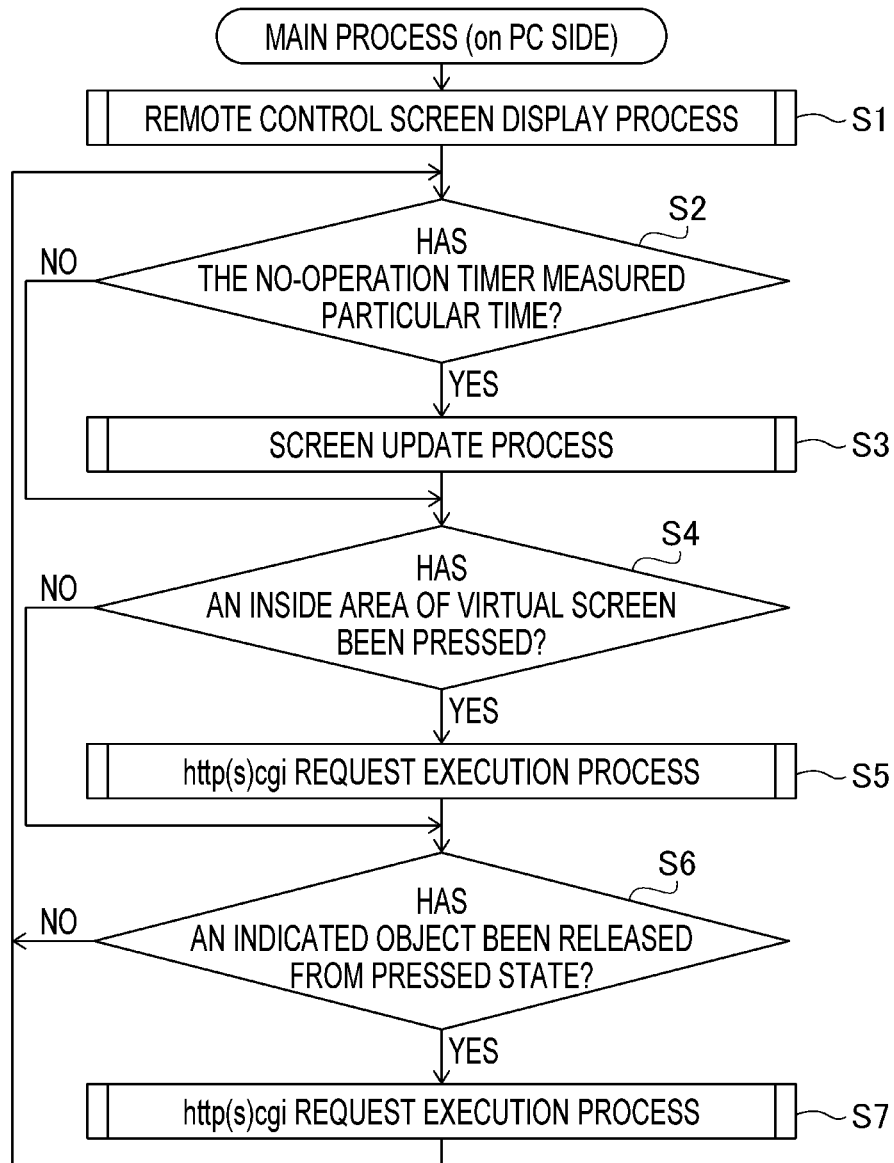
FIG. 17 is a flowchart showing a procedure of a main process to be performed by the CPU of the PC, in a third illustrative embodiment according to one or more aspects of the present disclosure.

FIG. 17 is a flowchart showing a procedure of a main process to be performed by the CPU 12 of the PC 10 in the third illustrative embodiment. The main process shown in FIG. 17 is configured by removing the determination of S8 and the determination of S9 from the main process shown in FIG. 4. In the third illustrative embodiment, when the administrator performs an input operation to the "Remote Panel" while the "Remote Panel" is being displayed in the detail pane 184 on the browser screen 180, the display mode changes according to the input operation, on both the "Remote Panel" and the panel 105. In other words, the control, as performed in the aforementioned first illustrative embodiment in such a manner that the display mode does not change according to the input operation, is not performed in the third illustrative embodiment. However, in this case, since the backlight of the panel 105 is turned off, the information displayed on the panel 105 is invisible to those who are in front of the MFP 100. Therefore, S8 and S9 are removed.

Figure 18:
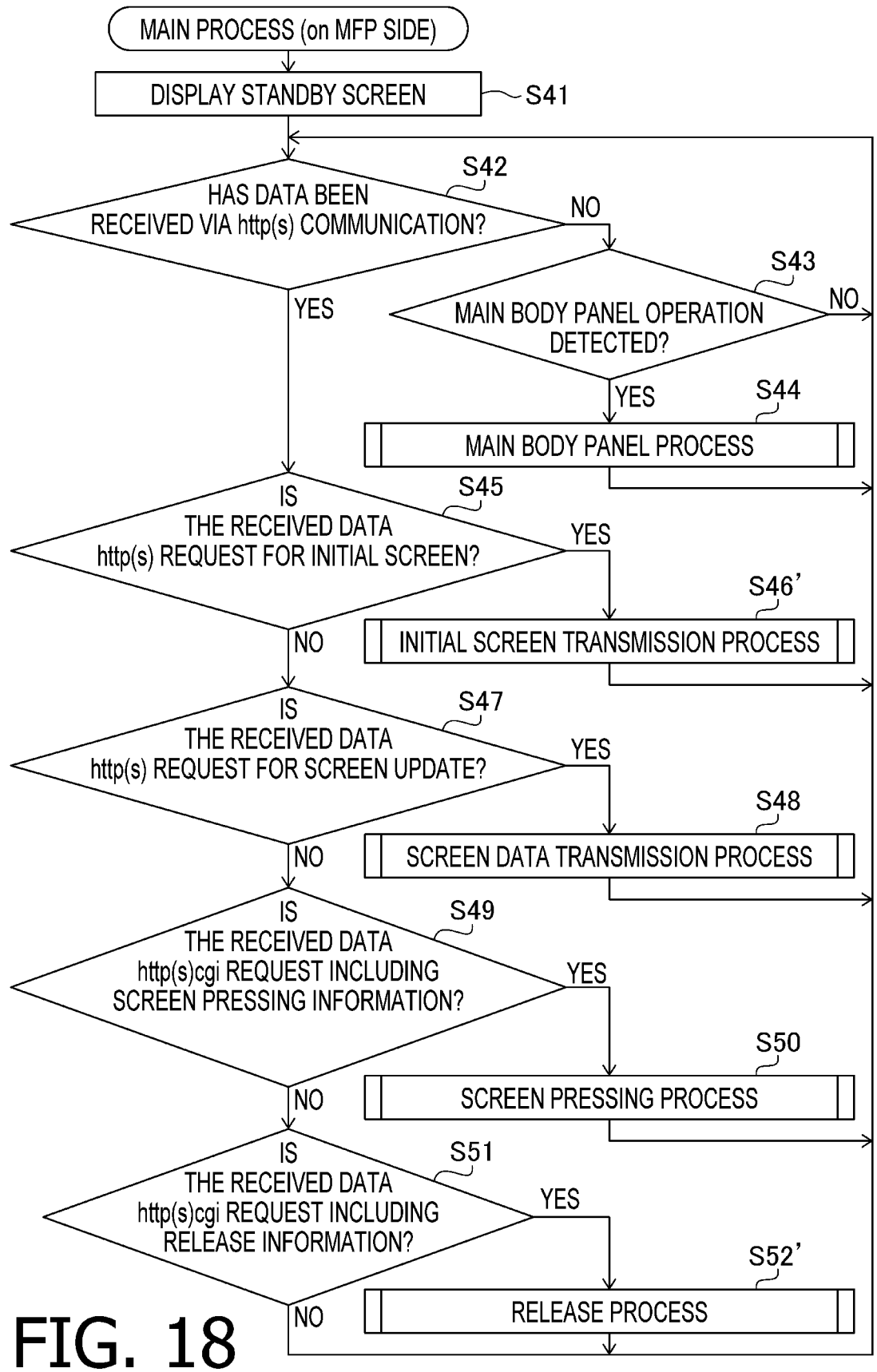
FIG. 18 is a flowchart showing a procedure of a main process to be performed by the CPU of the MFP, in the third illustrative embodiment according to one or more aspects of the present disclosure.

FIG. 18 is a flowchart showing a procedure of a main process to be performed by the CPU 101 of the MFP 100 in the third illustrative embodiment. The main process shown in FIG. 18 is configured by removing the determination of S53 and the process of S54 from the main process shown in FIGS. 8A and 8B and partially modifying the initial screen transmission process and the release process. A reason for removing S53 and S54 is substantially the same as the aforementioned reason for removing S8 and S9.

Figure 19:
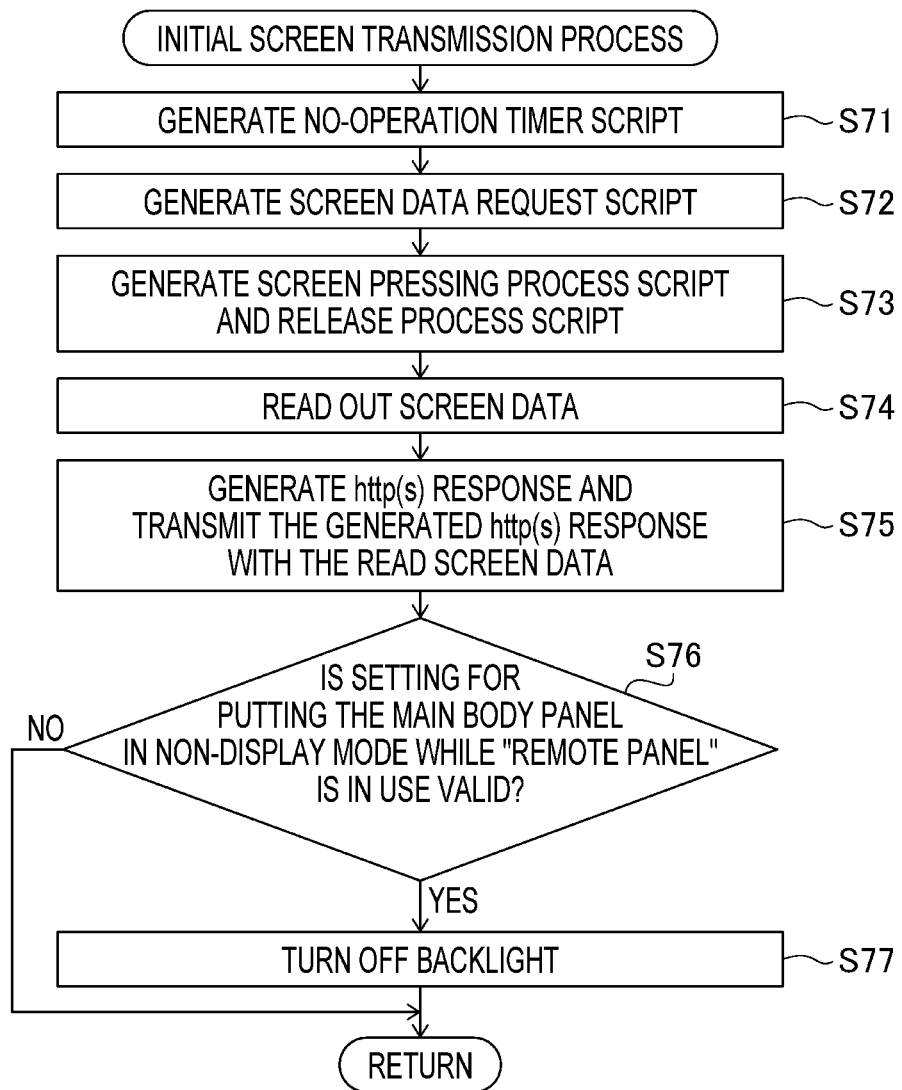
FIG. 19 is a flowchart showing a procedure of an initial screen transmission process included in the main process shown in FIG. 18, in the third illustrative embodiment according to one or more aspects of the present disclosure.

FIG. 19 shows a detailed procedure of an initial screen transmission process of S46' in FIG. 18. The initial screen transmission process shown in FIG. 19 is configured by adding a determination of S76 and a process of S77 to the initial screen transmission process shown in FIG. 10.

In S76, CPU 101 determines whether a setting for putting the main body panel in a non-display mode while the "Remote Panel" is in use is valid. When determining that the setting for putting the main body panel in the non-display mode while the "Remote Panel" is in use is valid (S76: Yes), the CPU 101 turns off the backlight of the panel 105 (S77). Thereafter, the CPU 101 terminates the initial screen transmission process. Meanwhile, when determining that the setting for putting the main body panel in the non-display mode while the "Remote Panel" is in use is not valid (S76: No), the CPU 101 terminates the initial screen transmission process without executing S77.

Figure 20A:
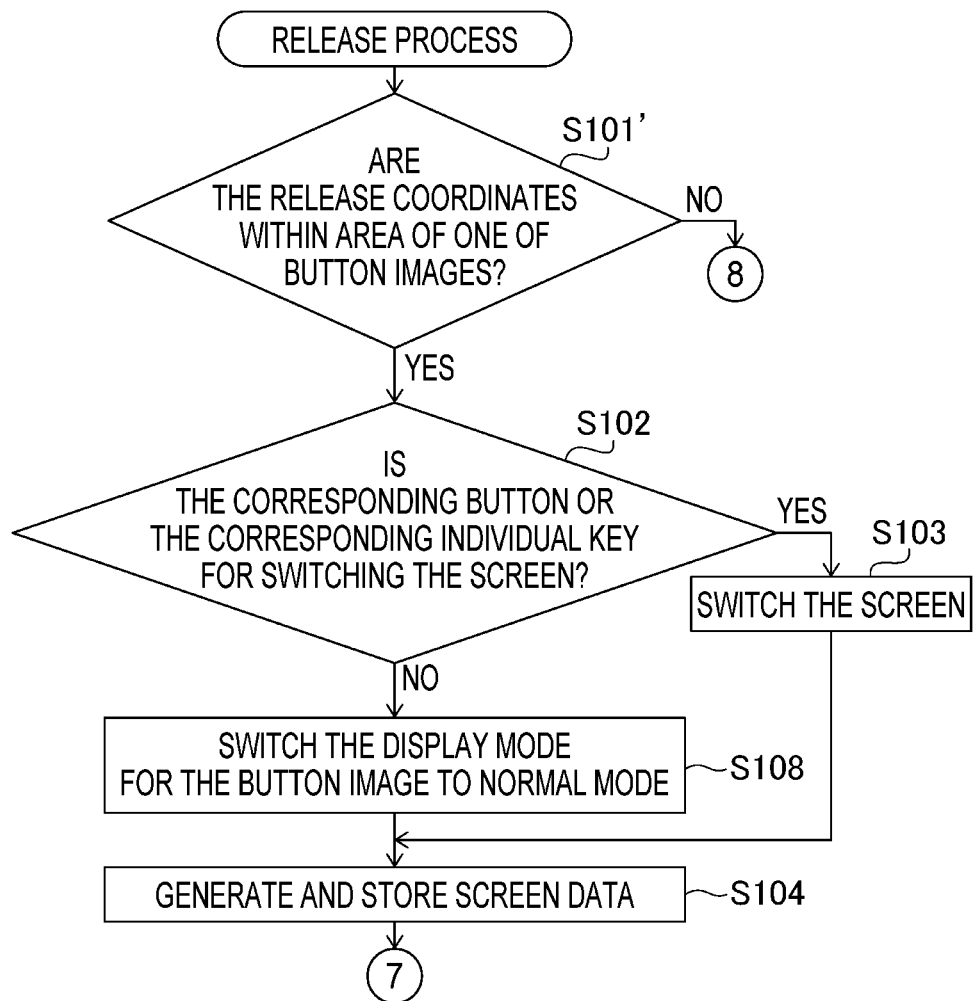
FIGS. 20A and 20B are flowcharts showing a procedure of a release process included in the main process shown in FIG. 18, in the third illustrative embodiment according to one or more aspects of the present disclosure.
Figure 20B:
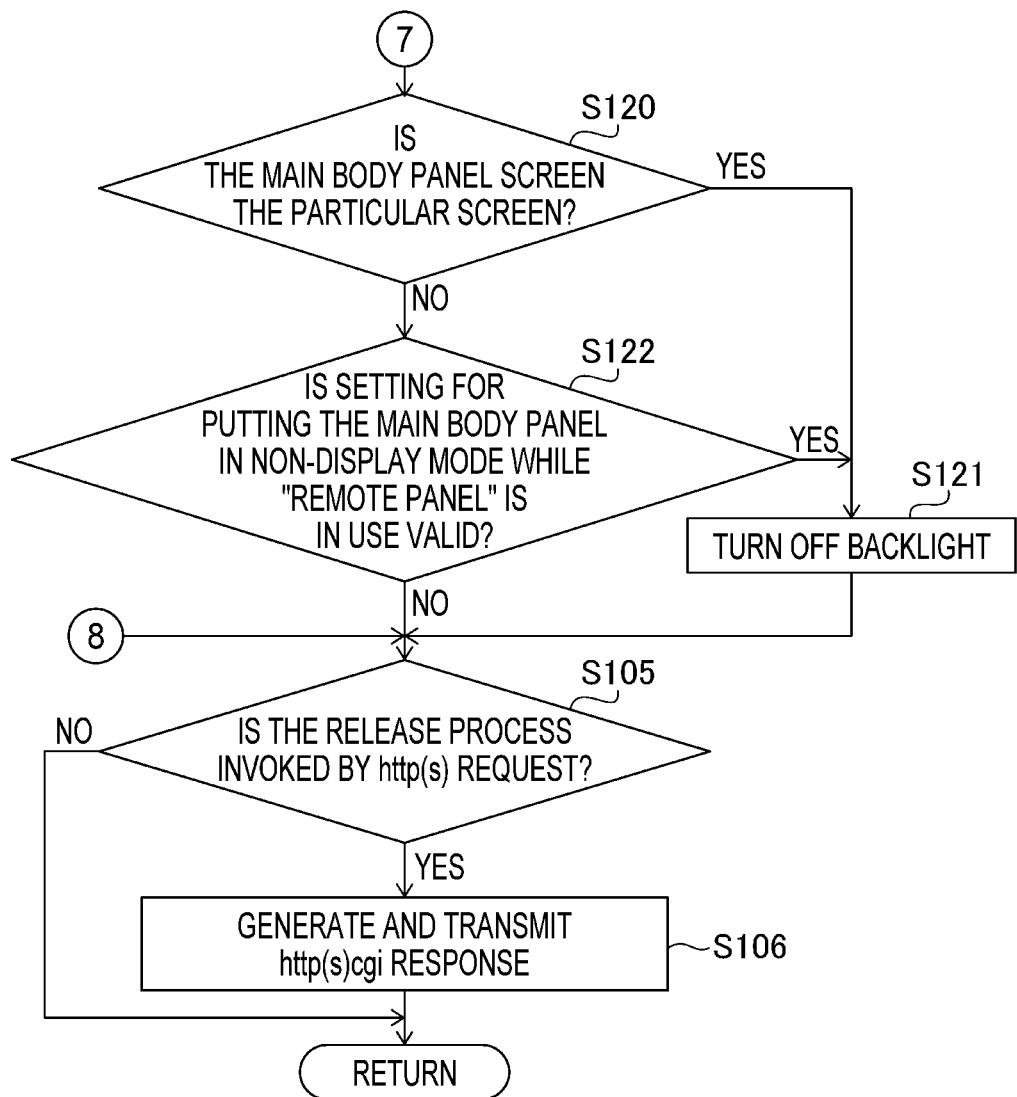

FIGS. 20A and 20B shows a detailed procedure of a release process of S52' in FIG. 18. The release process shown in FIGS. 20A and 20B is configured by modifying the release process shown in FIGS. 13A and 13B, more specifically, by deleting part of the determination of S101, removing the determination of S107, the determination of S109, and the process of S110, and adding processes of S120 to S122.

In S101', the CPU 101 determines whether the release coordinates are within an area of one of the button images. A reason for deleting the determination as to whether a release notification for an individual key has been given (see S101 in FIG. 13A) is substantially the same as the aforementioned reason for removing S8 and S9.

In S120, the CPU 101 determines whether the main body panel screen is the particular screen. When determining that the main body panel screen is the particular screen (S120: Yes), the CPU 101 turns off the backlight of the panel 105 (S121). Thereafter, the CPU 101 goes to S105. Meanwhile, when determining that the main body panel screen is not the particular screen (S120: No), the CPU 101 determines whether the setting for putting the main body panel in the non-display mode while the "Remote Panel" is in use is valid, in substantially the same manner as in S76 (S122). When determining that the setting for putting the main body panel in the non-display mode while the "Remote Panel" is in use is not valid (S122: No), the CPU 101 proceeds to S105. Meanwhile, when determining that the setting for putting the main body panel in the non-display mode while the "Remote Panel" is in use is valid (S122: Yes), the CPU 101 turns off the backlight of the panel 105 (S121). The backlight of the panel 105 is on by default. Hence, for instance, the CPU 101 may turn on the backlight of the panel 105 at the same time when displaying the standby screen in the aforementioned step S41 (see FIG. 18).

Thus, in the third illustrative embodiment, when the particular screen is being displayed on the panel 105 of the MFP 100, the backlight of the panel 105 is turned off. Therefore, there is no risk for confidential information on the MFP 100 to leak to the third party other than the administrator.

In addition, the main body panel may be set to the non-display mode while the "Remote Panel" is in use. Specifically, when the setting for putting the main body panel in the non-display mode while the "Remote Panel" is in use is valid, the backlight of the panel 105 is turned off even while the "Remote Panel" is in use. Thus, it is possible to further improve the security of the confidential information on the MFP 100.

Hereinabove, the illustrative embodiments according to aspects of the present disclosure have been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only exemplary illustrative embodiments of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications may be feasible.

In the aforementioned illustrative embodiments, the MFP 100 has been described as an example of an "image forming apparatus" according to aspects of the present disclosure. However, examples of the "image forming apparatus" according to aspects of the present disclosure may include, but are not limited to, standalone printers, standalone image scanners, and standalone copy machines, as well as the MFP 100.

In the aforementioned illustrative embodiments, the CPU 101 has been described as an example of a "controller" according to aspects of the present disclosure. However, the "controller" according to aspects of the present disclosure may include one or more CPUs and one or more dedicated circuits. Examples of the dedicated circuits may include, but are not limited to, ASICs ("ASIC" is an abbreviation for "Application Specific Integrated Circuit") and FPGAs ("FPGA" is an abbreviation for "Field Programmable Gate Array").

The following shows examples of associations between elements exemplified in the aforementioned illustrative embodiments and modifications and elements according to aspects of the present disclosure. The image forming system 1 may be an example of an "image forming system" according to aspects of the present disclosure. The MFP 100 may be an example of an "image forming apparatus" according to aspects of the present disclosure. The network I/F 108 may be an example of a "communication interface" according to aspects of the present disclosure, and may be an example of a "second communication interface" according to aspects of the present disclosure. The panel 105 may be an example of a "display" according to aspects of the present disclosure, and may be an example of a "second display" according to aspects of the present disclosure. The CPU 101 may be included in a "controller" according to aspects of the present disclosure, and may be included in a "second controller" according to aspects of the present disclosure. The CPU 101 may be an example of a "processor" according to aspects of the present disclosure. The ROM 102 storing the control programs 102a may also be included in the "controller" according to aspects of the present disclosure, and may also be included in the "second controller" according to aspects of the present disclosure. The ROM 102 storing the control programs 102a may be an example of a "memory storing computer-readable instructions" according to aspects of the present disclosure. The PC 10 may be an example of an "information processing device" according to aspects of the present disclosure. The network I/F 20 may be an example of a "first communication interface" according to aspects of the present disclosure. The display 18 may be an example of a "first display" according to aspects of the present disclosure. The CPU 12 may be included in a "first controller" according to aspects of the present disclosure. The particular screen may be an example of a "particular screen" according to aspects of the present disclosure. The panel 105 and the keys 106 may be included in a "user interface" of the "image forming apparatus" according to aspects of the present disclosure.

What is claimed is:

1. An image forming apparatus comprising:
a communication interface;
a user interface; and
a controller configured to:
  cause the user interface to display a display screen thereon;
  when receiving an initial request for remote access from an information processing device via the communication interface, transmit to the information processing device a response to the initial request for remote access;
  receive an operation via the user interface regardless of whether the initial request for remote access has been received;
  in response to receiving the operation via the user interface, update the display screen displayed on the user interface according to the received operation;
  when receiving remote access from the information processing device to which the response to the initial request for remote access has been transmitted, determine whether to perform display processing for the display screen in accordance with the remote access or to impose a display restriction on the display screen, based on whether the received remote access includes an instruction to display a particular screen as the display screen on the user interface;
  when the remote access does not include an instruction to display the particular screen as the display screen on the user interface, perform the display processing for the display screen in accordance with the remote access, thereby causing the user interface to display the display screen in an unrestricted manner, generate screen data for causing the information processing device to display a same screen as the display screen being displayed on the user interface in the unrestricted manner, and transmit the generated screen data to the information processing device, wherein when the operation has been received via the user interface after the receipt of the initial request for remote access, the controller generates the screen data for causing the information processing device to display the same screen as the display screen updated according to the received operation in the unrestricted manner and transmits the generated screen data to the information processing device; and
  when the remote access includes an instruction to display the particular screen as the display screen on the user interface, impose the display restriction on the display screen, thereby causing the user interface to display the display screen in a restricted manner, generate screen data for causing the information processing device to display the same screen as the display screen being displayed on the user interface in the restricted manner, and transmit the generated screen data to the information processing device, wherein when the operation has been received via the user interface after the receipt of the initial request for remote access, the controller generates the screen data for causing the information processing device to display the same screen as the display screen updated according to the received operation in the restricted manner, and transmits the generated screen data to the information processing device.

2. The image forming apparatus according to claim 1, wherein a screen on the user interface immediately before the image forming apparatus makes a transition to a maintenance mode and a screen on the user interface after the transition are defined as the particular screen.

3. The image forming apparatus according to claim 1, wherein a screen on the user interface immediately before an administrator logs in to the image forming apparatus from the information processing device and a screen on the user interface after the login are defined as the particular screen.

4. The image forming apparatus according to claim 1, wherein the controller is further configured to, when the remote access is a key operation to remotely operate a key on the display screen by operating a corresponding key on the same screen as the display screen, impose the display restriction to leave unchanged a display mode for the remotely-operated key.

5. The image forming apparatus according to claim 4, wherein the key operation is for entering a password.

6. The image forming apparatus according to claim 4, wherein the key operation is performed by operating a focus mode processing key.

7. The image forming apparatus according to claim 4, wherein the controller is further configured to select one of:
  a first mode to change the display mode for the key corresponding to the operated key; and
  a second mode to not change the display mode for the key corresponding to the operated key.

8. The image forming apparatus according to claim 4, wherein the information processing device includes a user interface configured to display the operated key on the same screen as the display screen.

9. The image forming apparatus according to claim 1, wherein the controller is further configured to, when the particular screen is being displayed as the display screen on the user interface, not accept a user operation via the user interface.

10. The image forming apparatus according to claim 1, wherein the controller is further configured to impose the display restriction to display no keys on the display screen.

11. The image forming apparatus according to claim 1, wherein the display comprises a backlight, and is configured to display the display screen using the backlight, and
wherein the controller is further configured to impose the display restriction to turn off the backlight.

12. The image forming apparatus according to claim 1, wherein the controller comprises:
a processor; and
a non-transitory computer readable medium storing computer-readable instructions configured to, when executed by the processor, cause the processor to:
  when the image forming apparatus is remotely connected with the information processing device via the communication interface, transmit the screen data to the information processing device;
  when receiving the remote access from the information processing device, perform the display processing for the display screen in accordance with the remote access; and
  when the remote access includes an instruction to display the particular screen as the display screen on the user interface, impose the display restriction on the display screen.

13. An image forming apparatus comprising:
a communication interface;
a user interface; and
a controller configured to:
  cause the user interface to display a display screen thereon;
  when receiving an initial request for remote access from an information processing device via the communication interface, transmit to the information processing device a response to the initial request for remote access;
  receive an operation via the user interface regardless of whether the initial request for remote access has been received;
  in response to receiving the operation via the user interface, update the display screen displayed on the user interface according to the received operation;
  prior to receiving the initial request for remote access, in response to receiving the operation via the user interface while a particular screen is being displayed as the display screen on the user interface, control the user interface to display a first screen as the display screen updated according to the received operation; and
  after receiving the initial request for remote access, in response to receiving the operation via the user interface to provide an instruction to display the particular screen as the display screen on the user interface, control the user interface to display a second screen as the display screen updated according to the received operation, generate screen data for causing the information processing device to display a same screen as the second screen, and transmit the generated screen data to the information processing device, the second screen being displayed in a restricted display mode that is different from an unrestricted display mode for the first screen.

14. An image forming system comprising:
an image forming apparatus; and
an information processing device configured to remotely access the image forming apparatus, the information processing device comprising:
  a first communication interface;
  a first user interface; and
  a first controller configured to:
    transmit an initial request for remote access to the image forming apparatus via the first communication interface,
    receive from the image forming apparatus a response to the initial request for the remote access,
    when the information processing device is remotely connected with the image forming apparatus via the first communication interface, transmit, to the image forming apparatus, a remote access request for causing a second user interface of the image forming apparatus to display a display screen, the display screen being a particular screen or not a particular screen;
    when the remote access request does not include an instruction to display the particular screen as the display screen on the second user interface, receive screen data transmitted by the image forming apparatus, and control the first user interface to display the same screen as the display screen being displayed on the second user interface of image forming apparatus in an unrestricted manner based on the received screen data; and
    transmit, to the image forming apparatus, subsequently remote access according to an input operation performed to the same screen on the first user interface as the display screen,
wherein the image forming apparatus comprises:
  a second communication interface;
  the second user interface; and
  a second controller configured to:
    cause the second user interface to display the display screen thereon;
    receive the initial request for remote access from the information processing device via the second communication interface;
    transmit the response to the initial request for remote access to the information processing device via the second communication interface;
    receiving an operation via the second user interface regardless of whether the initial request for remote access has been received;
    in response to receiving the operation via the second user interface, update the display screen on the second user interface according to the received operation;
    when receiving the remote access request from the information processing device to which the response to the initial request for remote access has been transmitted, determine whether to perform a display processing for the display screen in accordance with the remote access request or impose a display restriction on the display based on whether the received remote access request includes an instruction to display the particular screen as the display screen on the second user interface;
    when the received remote access request does not include an instruction to display the particular screen as the display screen on the second user interface, perform the display processing for displaying the screen in accordance with the received remote access request, thereby causing the second user interface to display the display screen in an unrestricted manner, generate the screen data for causing the information processing device to display the same screen as the display screen being displayed on the second user interface in the unrestricted manner, and transmit the generated screen data to the information processing device via the second communication interface, wherein when the operation has been received via the second user interface after receipt of the initial request for remote access, the second controller generates the screen data for causing the information processing device to display the same screen as the display screen updated according to the received operation in the unrestricted manner and transmits the generated screen data to the information processing device via the second communication interface; and
  when the received remote access includes an instruction to display the particular screen as the display screen on the second user interface, impose the display restriction on the display screen, thereby causing the second user interface to display the display screen in a restricted manner, generate screen data for causing the information processing device to display the same screen as the display screen being displayed on the second user interface in the restricted manner, and transmit the generated screen data to the information processing device, wherein when the operation has been received via the second user interface after the receipt of the initial request for remote access, the second controller generates the screen data for causing the information processing device to display the same screen as the display screen updated according to the received operation in the restricted manner, and transmits the generated screen data to the information processing device via the second communication interface wherein the same screen is displayed on the first user interface based on the generated screen data.

15. An image forming system comprising:
an image forming apparatus; and
an information processing device configured to remotely access the image forming apparatus, the information processing device comprising:
    a first communication interface;
    a first user interface; and
    a first controller configured to:
        transmit an initial request for remote access to the image forming apparatus via the first communication interface,
        receive from the image forming apparatus a response to the initial request for the remote access,
wherein the image forming apparatus comprises:
    a second communication interface;
    a second user interface; and
    a second controller configured to:
        cause the second user interface to display a display screen thereon;
        receive the initial request for remote access from the information processing device via the second communication interface;
        transmit the response to the initial request for remote access to the information processing device via the second communication interface;
        receiving an operation via the second user interface regardless of whether the initial request for remote access has been received;
        in response to receiving via the second user interface, update the display screen on the second user interface according to the received operation;
        prior to receiving the initial request for remote access from the information processing device, in response to receiving the operation via the second user interface while a particular screen is being displayed as the display screen on the second user interface, control the second user interface to display a first screen as the display screen updated according to the received operation;
        after receiving the initial request for remote access from the information processing device, in response to receiving the operation via the second user interface to provide an instruction to display the particular screen as the display screen on the second user interface, control the second user interface to display a second screen as the display screen updated according to the received operation, generate screen data for causing the information processing device to display a same screen as the second screen and transmit the generated screen data via the second communication interface to the information processing device, the second screen being displayed in a restricted mode that is different from an unrestricted mode for the first screen.

16. An image forming apparatus comprising:
a communication interface;
a user interface; and
a controller configured to:
    cause the user interface to display a display screen thereon;
    in response to receiving an initial request for remote access from an information processing device via the communication interface, transmit to the information processing device a response to the initial request for remote access;
    receive an operation via the user interface regardless of whether the initial request for remote access has been received;
    in response to receiving the operation via the user interface while a particular screen is not being displayed as the display screen on the user interface, cause the user interface to display, as an unrestricted display screen, the display screen in an unrestricted state where the display screen is updated according to the received operation;
    in response to receiving, while the unrestricted display screen is being displayed, remote access from the information processing device to which the response to the initial request for remote access has been transmitted, generate screen data for causing the information processing device to display a same screen as the unrestricted display screen, and transmit the generated screen data to the information processing device;
    in response to receiving the operation via the user interface while the particular screen is being displayed as the display screen on the user interface after the response to the initial request for remote access has been transmitted to the information processing device, cause the user interface to display, as a restricted display screen, the display screen in a restricted state where the display screen is not updated according to the received operation; and
    in response to receiving, while the restricted display screen is being displayed, remote access from the information processing device to which the response to the initial request for remote access has been transmitted, generate screen data for causing the information processing device to display the same screen as the restricted display screen, and transmit the generated screen data to the information processing device.

17. An image forming system comprising:
an image forming apparatus; and
an information processing device configured to remotely access the image forming apparatus, the information processing device comprising:
    a first communication interface;
    a first user interface; and
    a first controller configured to:
        transmit an initial request for remote access to the image forming apparatus via the first communication interface,
        receive from the image forming apparatus a response to the initial request for the remote access,
wherein the image forming apparatus comprises:
    a second communication interface;
    a second user interface; and
    a second controller configured to:
        cause the second user interface to display a display screen thereon;

receive the initial request for remote access from the information processing device via the second communication interface;

transmit the response to the initial request for remote access to the information processing device via the second communication interface;

receiving an operation via the second user interface regardless of whether the initial request for remote access has been received;

in response to receiving the operation via the second user interface while a particular screen is not being displayed as the display screen on the second user interface, cause the second user interface to display, as an unrestricted display screen, the display screen in an unrestricted state where the display screen is updated according to the received operation; and in response to receiving, while the unrestricted display screen is being displayed, remote access from the information processing device via the second communication interface to which the response to the initial request for remote access has been transmitted, generate screen data for causing the information processing device to display a same screen as the unrestricted display screen, and transmit the generated screen data to the information processing device, wherein the first controller is further configured to:

receive the generated screen data and display on the first user interface, the same screen based on the received screen data, wherein the second controller is further configured to:

in response to receiving the operation via the second user interface while the particular screen is being displayed as the display screen on the second user interface after the response to the initial request for remote access has been transmitted to the information processing device, cause the second user interface to display, as a restricted display screen, the display screen in a restricted state where the display screen is not updated according to the received operation;

wherein the first controller is further configured to:

transmit a remote access request to the image forming apparatus after the response to the initial request for remote access has been received via the first communication interface, wherein the second controller is further configured to:

in response to receiving, while the restricted display screen is being displayed, remote access from the information processing device to which the response to the initial request for remote access has been transmitted, generate screen data for causing the information processing device to display the same screen as the restricted display screen, and transmit the generated screen data to the information processing device and wherein the same screen is displayed on the first user interface based the screen data.

* * * * *